United States Patent
Kim et al.

(10) Patent No.: US 9,880,345 B2
(45) Date of Patent: Jan. 30, 2018

(54) LIGHTING MODULE

(75) Inventors: Ki Hyun Kim, Seoul (KR); Eun Hwa Kim, Seoul (KR); Ji Hyoung Maeng, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 347 days.

(21) Appl. No.: 14/232,741

(22) PCT Filed: Jul. 25, 2012

(86) PCT No.: PCT/KR2012/005907
§ 371 (c)(1),
(2), (4) Date: Apr. 14, 2014

(87) PCT Pub. No.: WO2013/015602
PCT Pub. Date: Jan. 31, 2013

(65) Prior Publication Data
US 2014/0218964 A1     Aug. 7, 2014

(30) Foreign Application Priority Data

Jul. 26, 2011  (KR) .......................... 10-2011-0073857
Jul. 26, 2011  (KR) .......................... 10-2011-0073858
(Continued)

(51) Int. Cl.
*F21V 8/00* (2006.01)
*F21V 15/01* (2006.01)
(Continued)

(52) U.S. Cl.
CPC .............. *G02B 6/0051* (2013.01); *F21S 4/20* (2016.01); *F21S 8/06* (2013.01); *F21V 7/0008* (2013.01);
(Continued)

(58) Field of Classification Search
CPC .............. F21S 4/20; F21V 11/08; F21V 11/14
(Continued)

(56) References Cited

U.S. PATENT DOCUMENTS 2,341,895 A      2/1944  Beck ............................. 240/78
5,692,822 A  *  12/1997  Dreyer ................. G02B 6/0096
                                                         362/23.16
(Continued)

FOREIGN PATENT DOCUMENTS

CN         1862335 A    11/2006
CN       201724100 U     1/2011
(Continued)

OTHER PUBLICATIONS

Chinese Office Action dated Apr. 22, 2015 issued in Application No. 201280036728.9 (with English translation).
(Continued)

*Primary Examiner* — Jong-Suk (James) Lee
*Assistant Examiner* — Christopher E Dunay
(74) *Attorney, Agent, or Firm* — KED & Associates, LLP

(57) ABSTRACT

A lighting module may be provided that includes: a first and a second light source units which are disposed to face each other; a first case in which the first light source unit is disposed; a second case in which the second light source unit is disposed; a first plate of which one side is connected to the first case, of which the other side is connected to the second case and which includes a first hole through which light emitted from the first and the second light source units passes; a second plate which is disposed to face the first plate and includes a second hole through which the light emitted from the first and the second light source units passes; and a first and a second optical sheets which are disposed on the first and the second plates.

20 Claims, 25 Drawing Sheets

(30) Foreign Application Priority Data

| Jul. 26, 2011 | (KR) | 10-2011-0073859 |
| Jul. 26, 2011 | (KR) | 10-2011-0073860 |
| Jul. 26, 2011 | (KR) | 10-2011-0073861 |
| Jul. 26, 2011 | (KR) | 10-2011-0073862 |

(51) Int. Cl.

| F21S 8/06 | (2006.01) |
| F21V 7/00 | (2006.01) |
| F21V 11/14 | (2006.01) |
| F21V 13/02 | (2006.01) |
| F21V 13/10 | (2006.01) |
| F21S 4/20 | (2016.01) |
| F21Y 101/00 | (2016.01) |
| F21Y 103/10 | (2016.01) |
| F21Y 115/10 | (2016.01) |

(52) U.S. Cl.
CPC .......... *F21V 7/0016* (2013.01); *F21V 7/0033* (2013.01); *F21V 11/14* (2013.01); *F21V 13/02* (2013.01); *F21V 13/10* (2013.01); *F21V 15/01* (2013.01); *G02B 6/005* (2013.01); *G02B 6/0031* (2013.01); *G02B 6/0055* (2013.01); *G02B 6/0096* (2013.01); *F21Y 2101/00* (2013.01); *F21Y 2103/10* (2016.08); *F21Y 2115/10* (2016.08)

(58) Field of Classification Search
USPC .................................. 362/600–634; 40/546
See application file for complete search history.

(56) References Cited

U.S. PATENT DOCUMENTS

| 6,296,372 | B1* | 10/2001 | Rhomberg | F21S 8/06 |
| | | | | 362/217.07 |
| 8,585,237 | B2* | 11/2013 | Kim | G02B 6/0055 |
| | | | | 362/224 |
| 8,690,380 | B2* | 4/2014 | Sato | F21V 7/22 |
| | | | | 362/217.05 |
| D711,584 | S* | 8/2014 | Parker | D26/120 |
| 9,176,268 | B2* | 11/2015 | Brick | F21K 9/00 |
| 2001/0046365 | A1* | 11/2001 | Bohle | F21S 8/04 |
| | | | | 385/146 |
| 2006/0256578 | A1 | 11/2006 | Yang et al. | |
| 2007/0047254 | A1* | 3/2007 | Schardt | G02B 5/0242 |
| | | | | 362/607 |
| 2010/0214228 | A1* | 8/2010 | Sailer | H01H 13/83 |
| | | | | 345/169 |
| 2011/0051402 | A1* | 3/2011 | Keller | F21S 8/06 |
| | | | | 362/147 |
| 2011/0131849 | A1* | 6/2011 | Sato | G02B 6/0061 |
| | | | | 40/564 |
| 2012/0127756 | A1* | 5/2012 | Kim | G02B 6/0055 |
| | | | | 362/612 |
| 2013/0114267 | A1* | 5/2013 | Ho | F21V 5/007 |
| | | | | 362/306 |
| 2014/0192557 | A1* | 7/2014 | Lu | G09F 13/14 |
| | | | | 362/612 |

FOREIGN PATENT DOCUMENTS

| CN | 102112802 A | 6/2011 |
| EP | 1 275 898 A2 | 1/2003 |
| EP | 2 312 199 A1 | 4/2011 |
| EP | 2 333 401 A1 | 6/2011 |
| JP | H10-188642 | 7/1998 |
| JP | 2005-521993 A | 7/2005 |
| JP | 2007-041622 A | 2/2007 |
| JP | 2008-270707 | 11/2008 |
| JP | 2009-289506 | 12/2009 |
| JP | 2010-108900 | 5/2010 |
| JP | 2010-122494 | 6/2010 |
| JP | 2010-277728 A | 12/2010 |
| KR | 2008-0101748 A | 11/2008 |
| KR | 10-2009-0016100 | 2/2009 |
| KR | 2011-0057518 A | 6/2011 |
| WO | WO 2011/004306 A1 | 1/2011 |

OTHER PUBLICATIONS

European Search Report dated Nov. 6, 2014 issued in Application No. 12 817 987.6.
International Search Report dated Feb. 13, 2013 for corresponding Application No. PCT/KR2012/005907.
European Search Report dated Jan. 8, 2016 issued in Application No. 12 817 987.6.
Korean Office Action dated Aug. 17, 2017 issued in Application No. 10-2011-0073859.
Korean Office Action dated Aug. 17, 2017 issued in Application No. 10-2011-0073860.
Japanese Office Action dated Jun. 14, 2016 issued in Application No. 2014-522747.

* cited by examiner

[Figure 1]
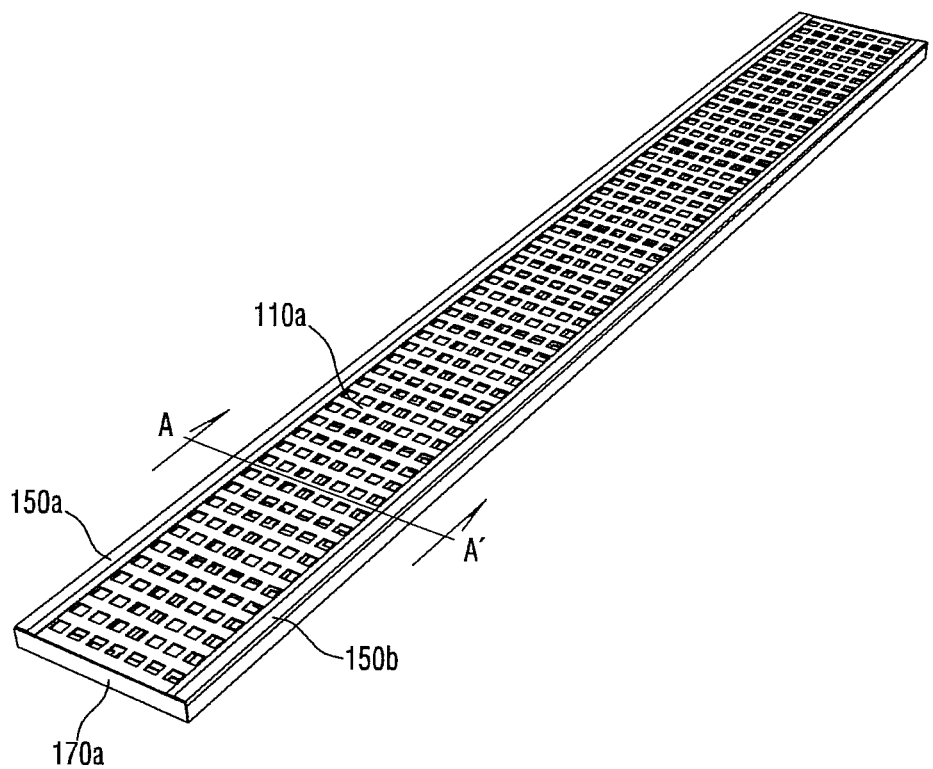

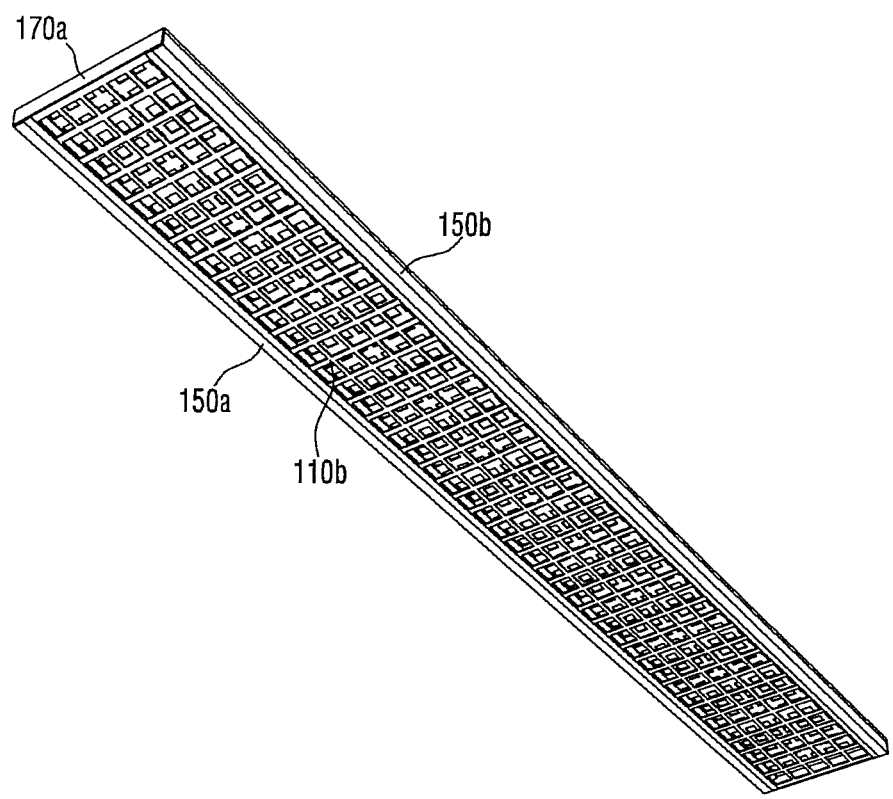
【Figure 2】

【Figure 3】
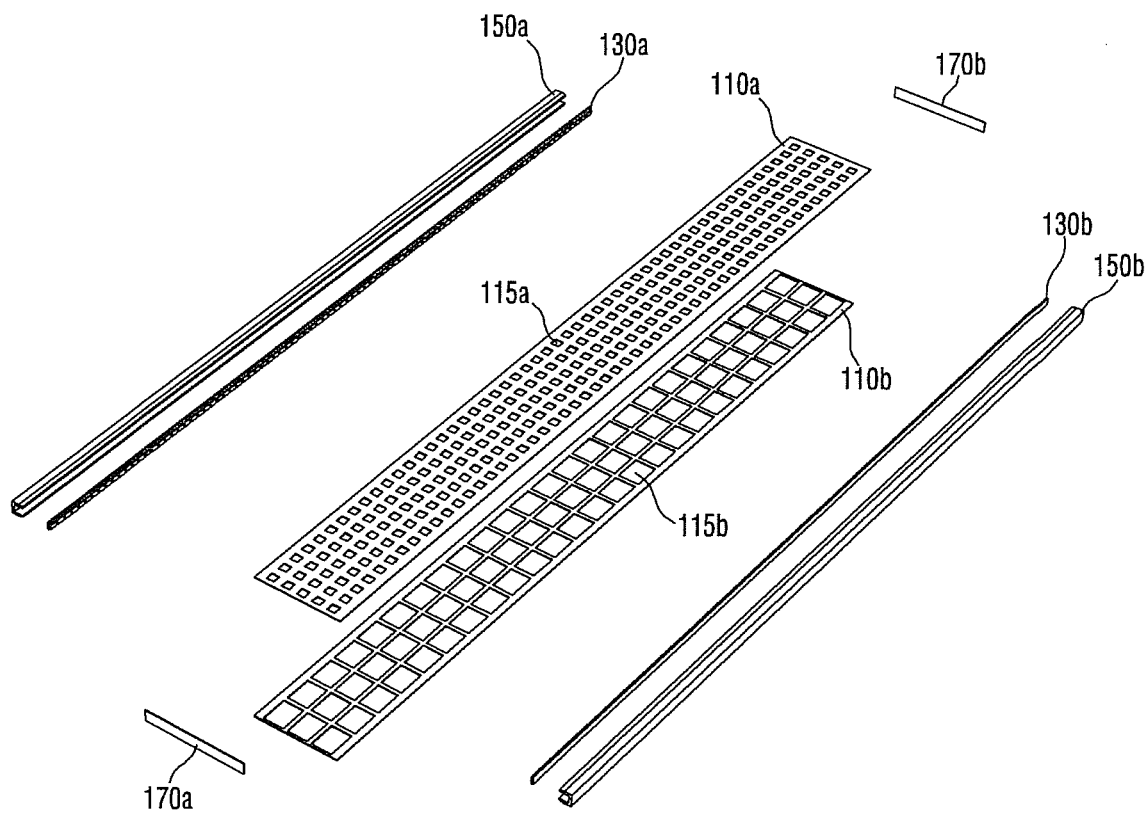
【Figure 4】
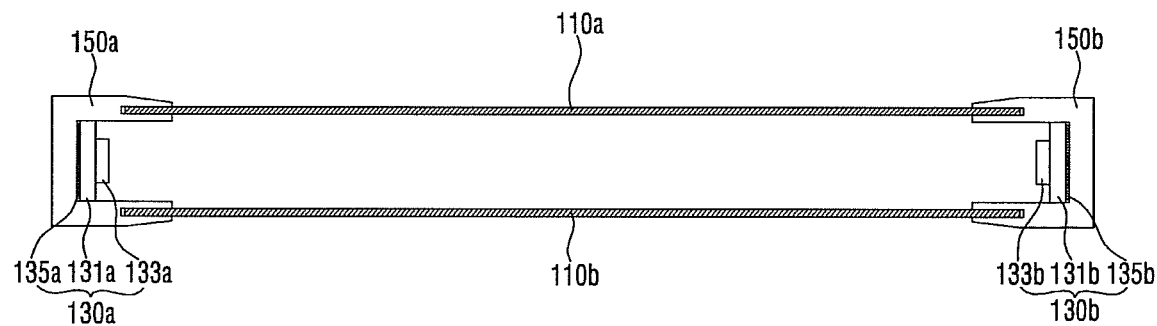

【Figure 5】
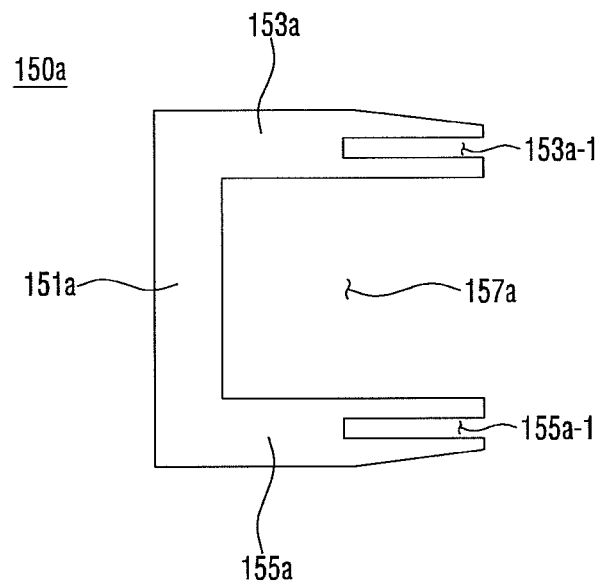
【Figure 6】
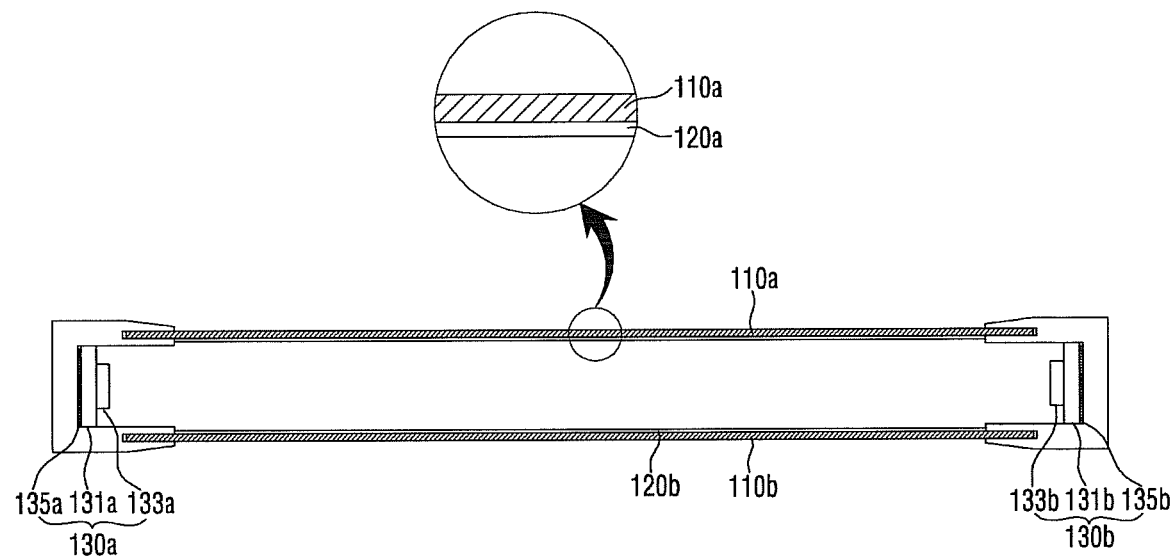

【Figure 7】
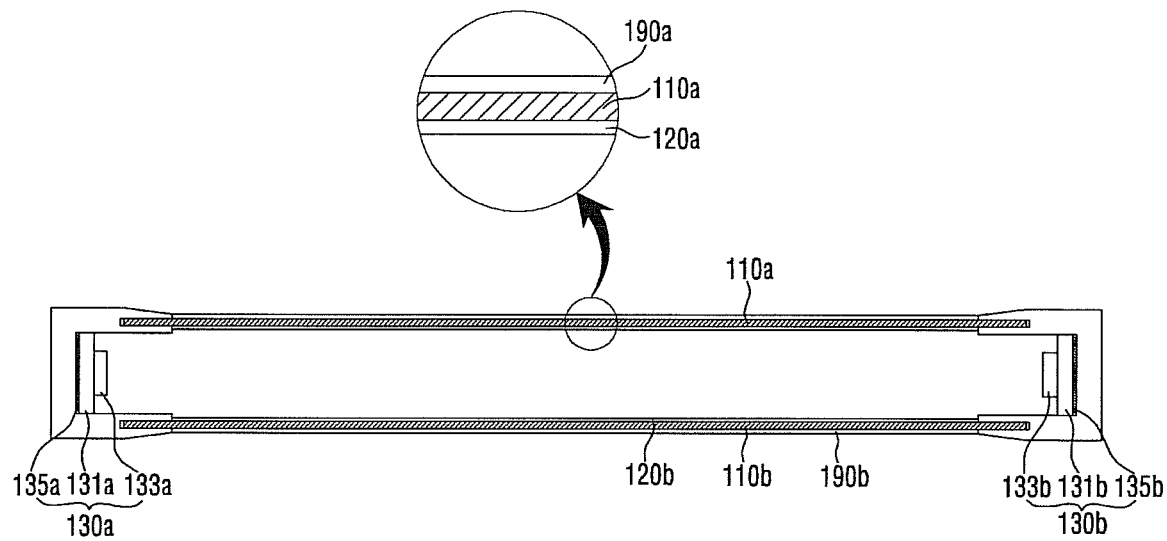
【Figure 8】
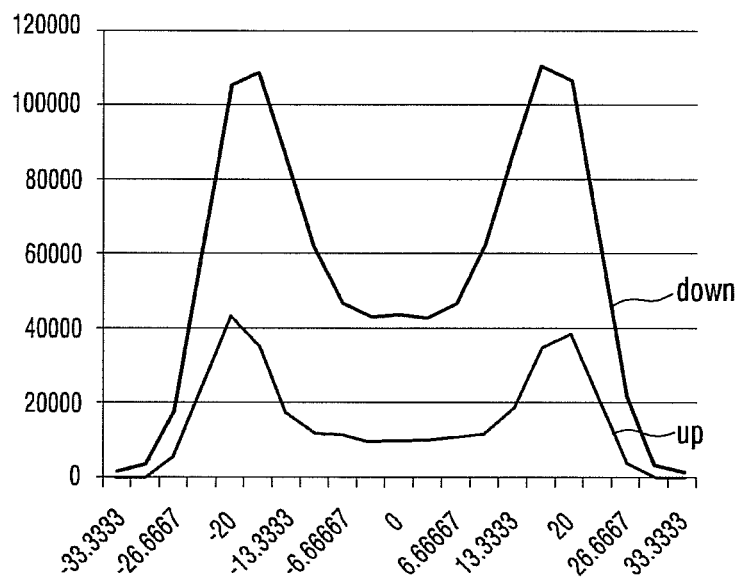

【Figure 9】
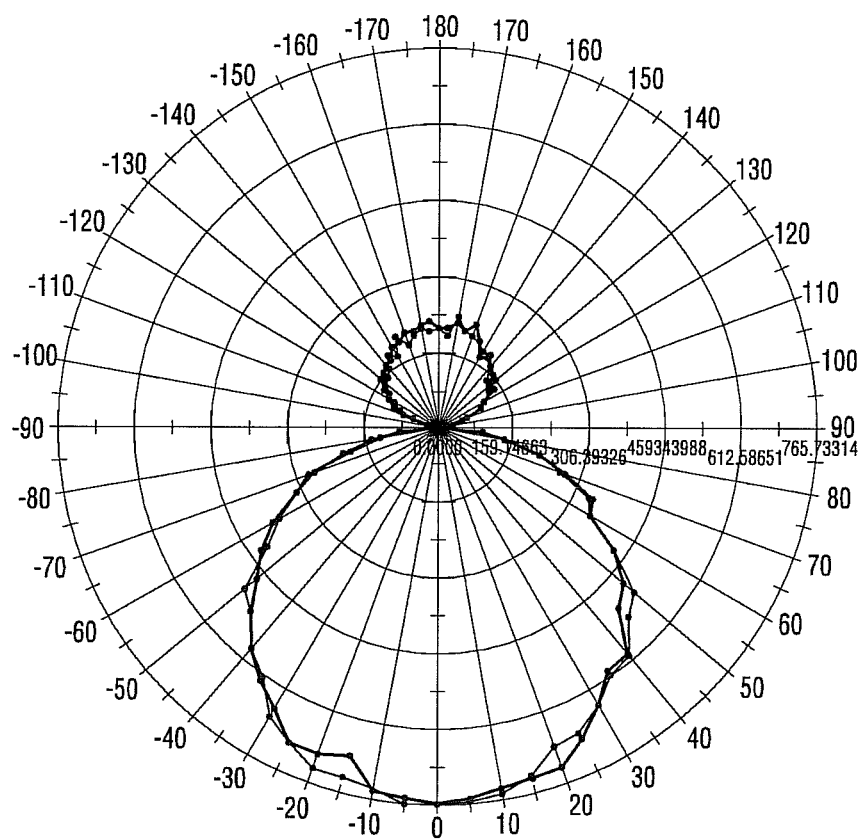

[Figure 10]
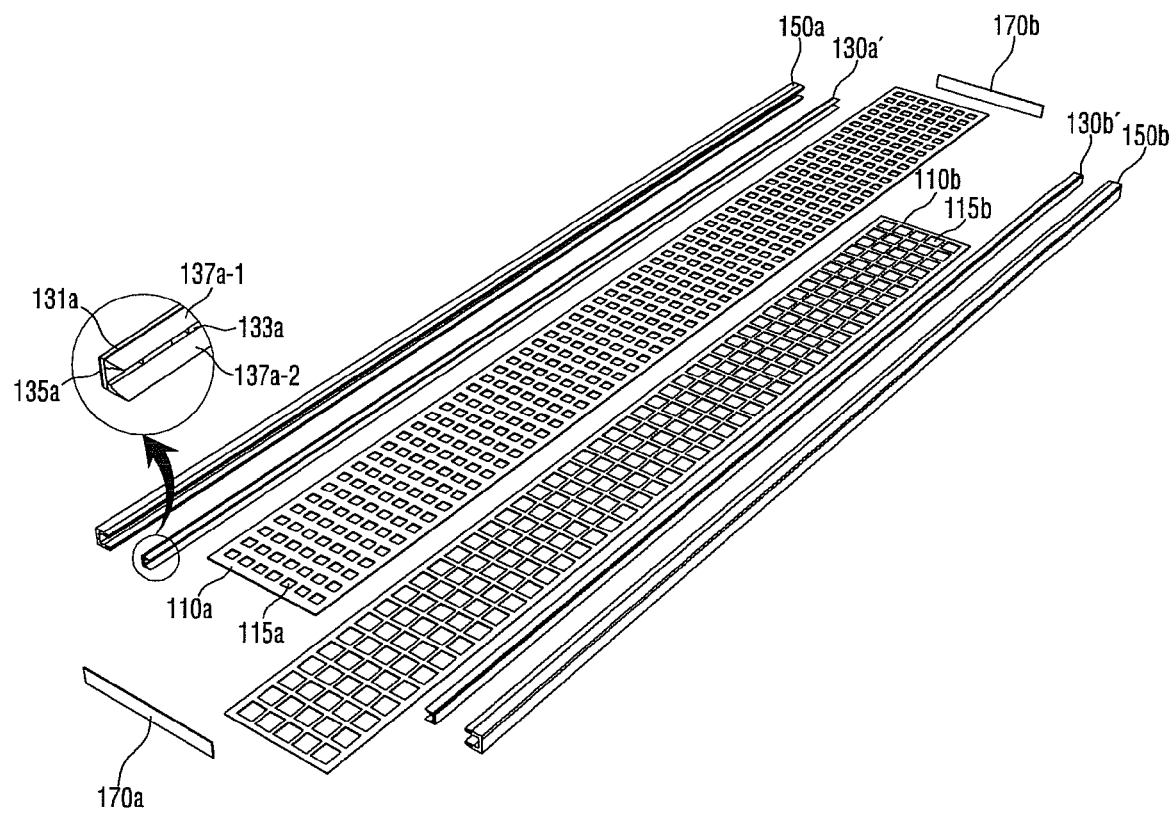
[Figure 11]
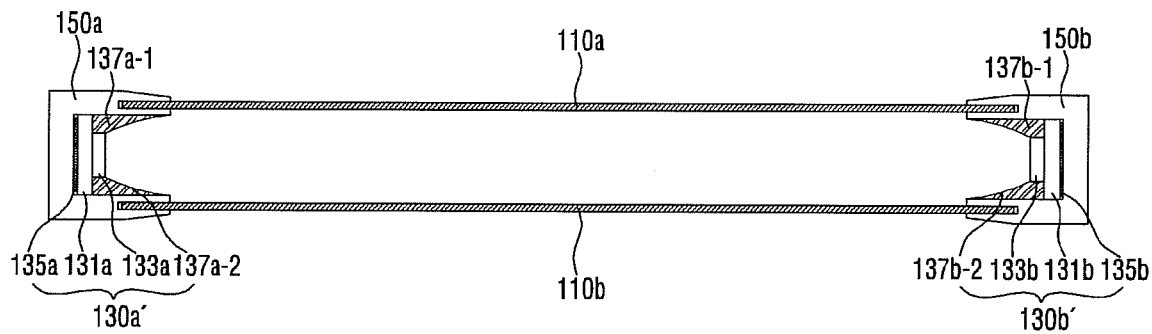

【Figure 12】
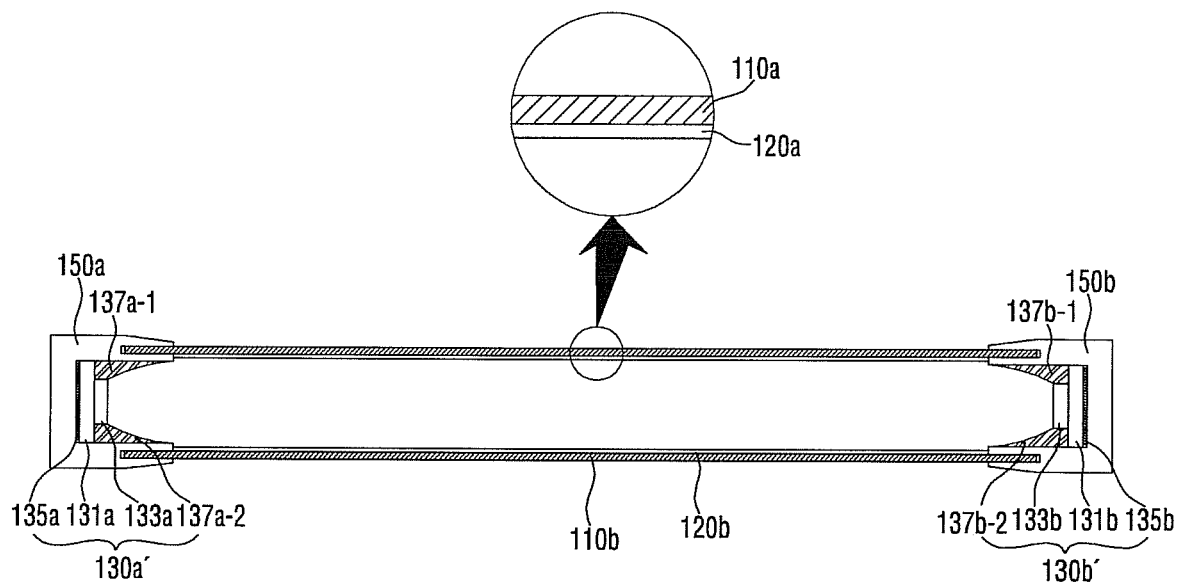
【Figure 13】
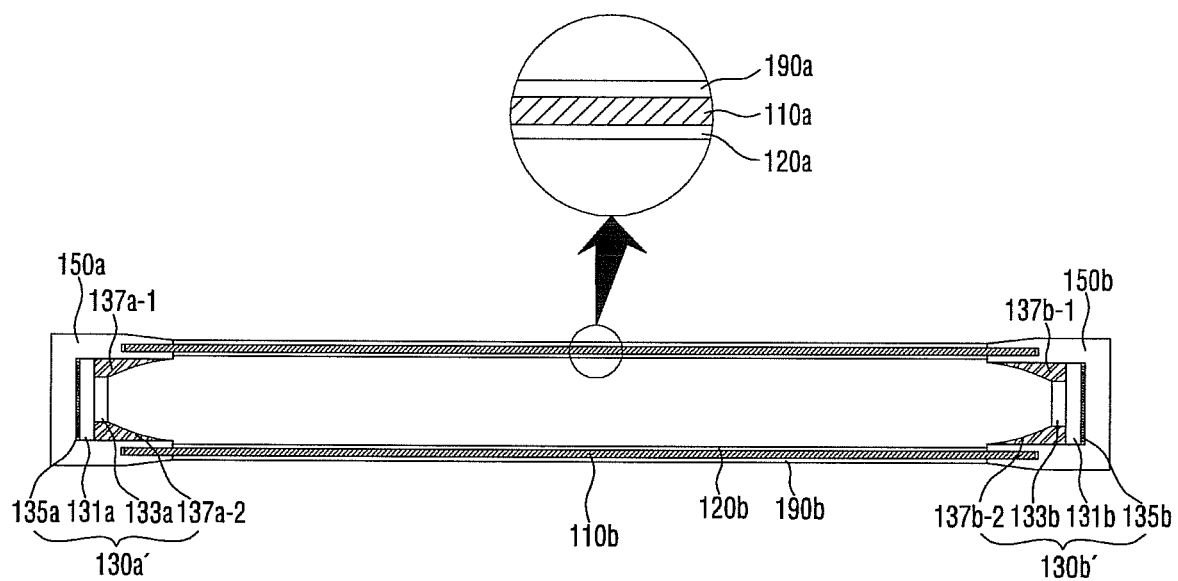

[Figure 14]
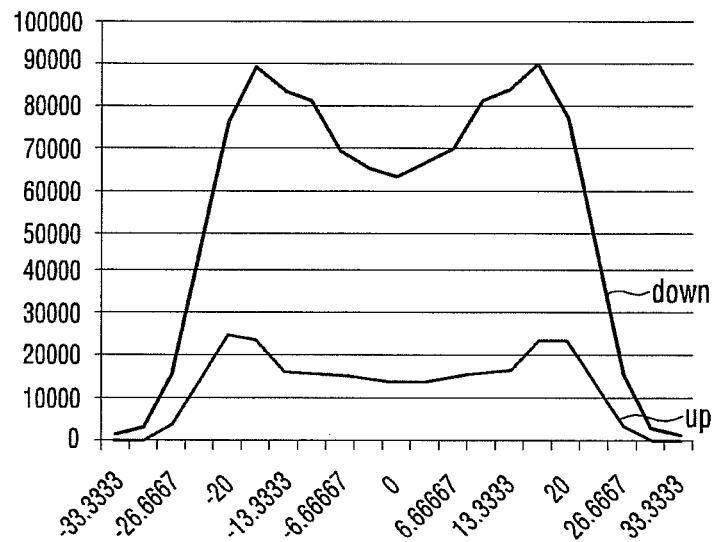
[Figure 15]
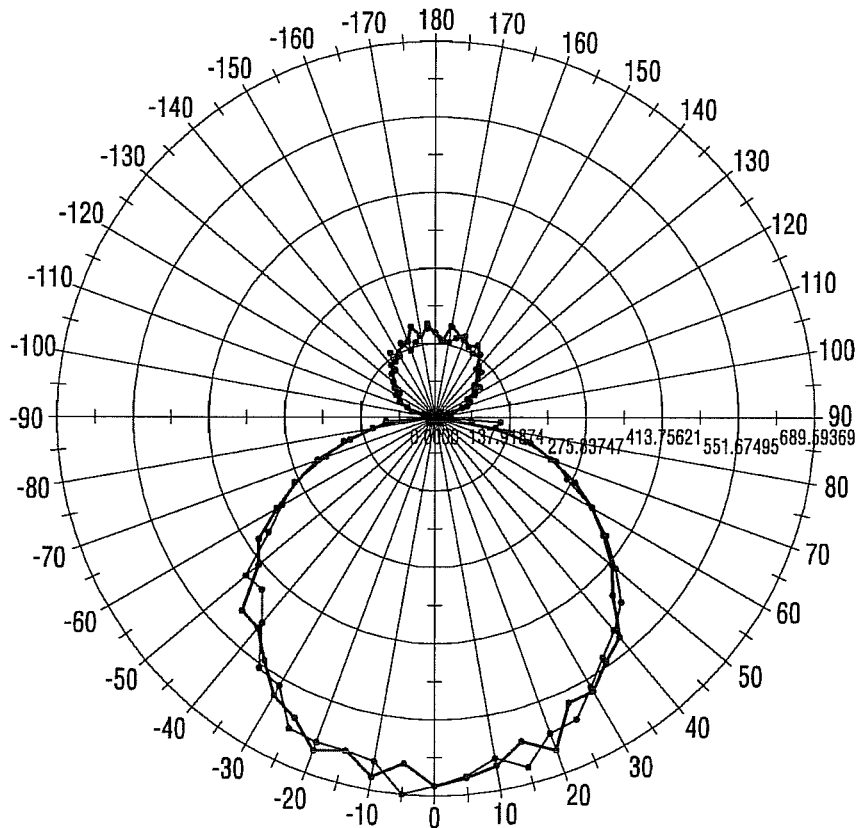

[Figure 16]
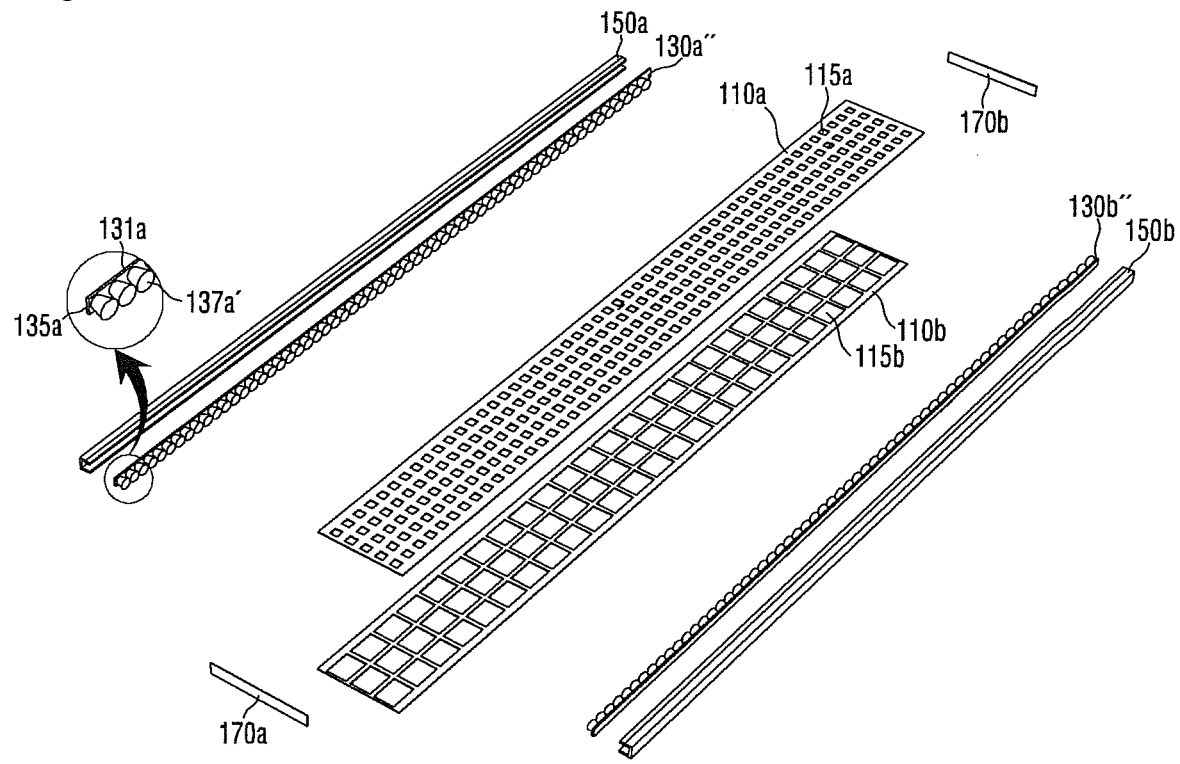
[Figure 17]
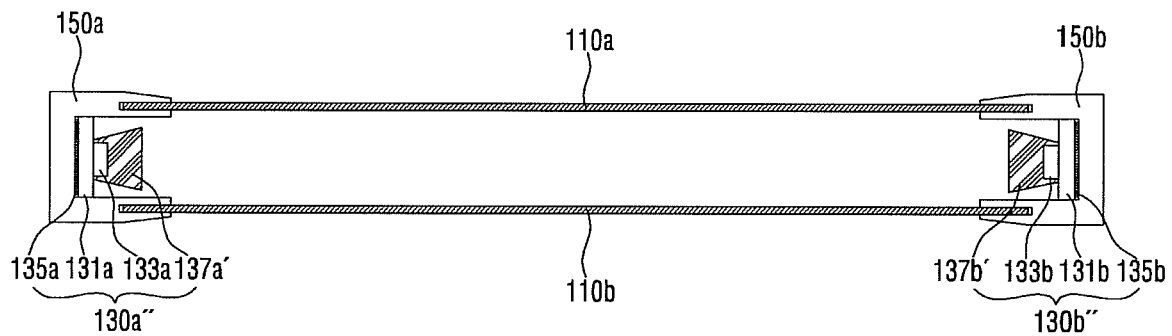

【Figure 18】
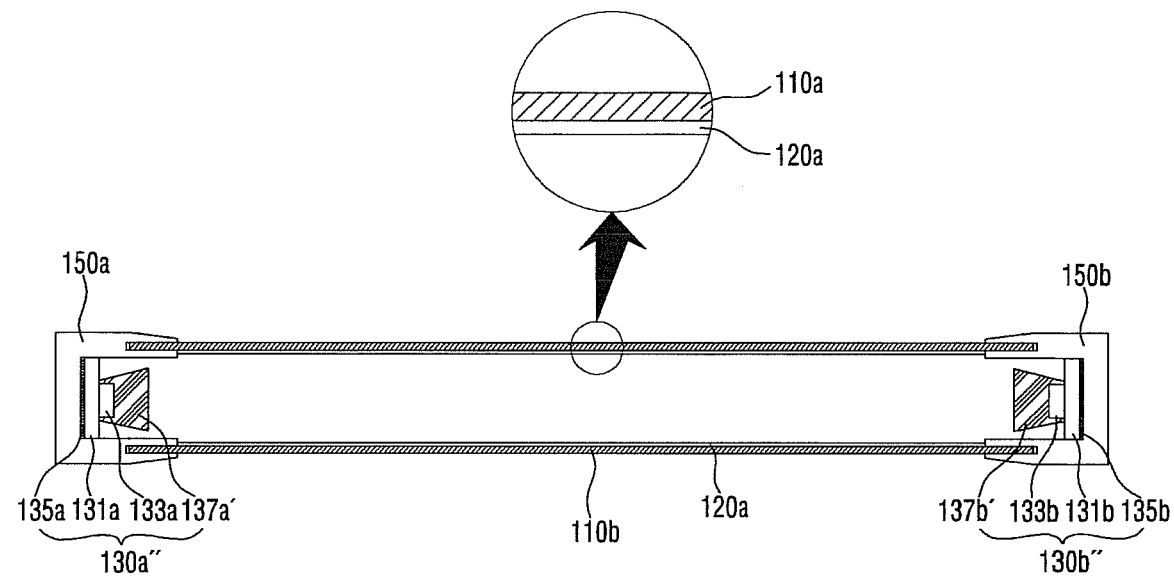
【Figure 19】
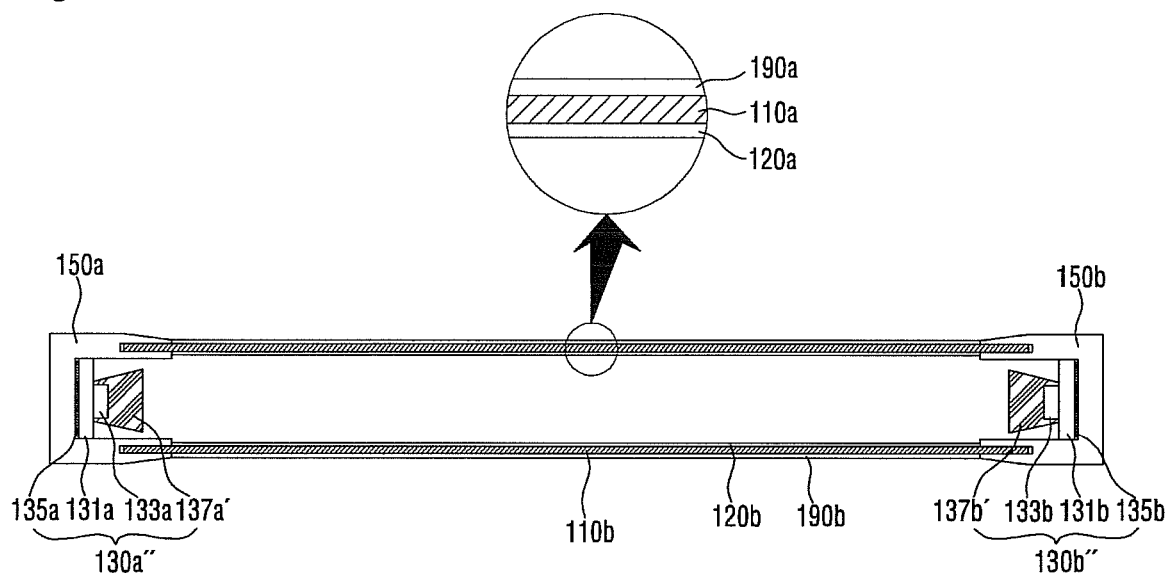

【Figure 20】
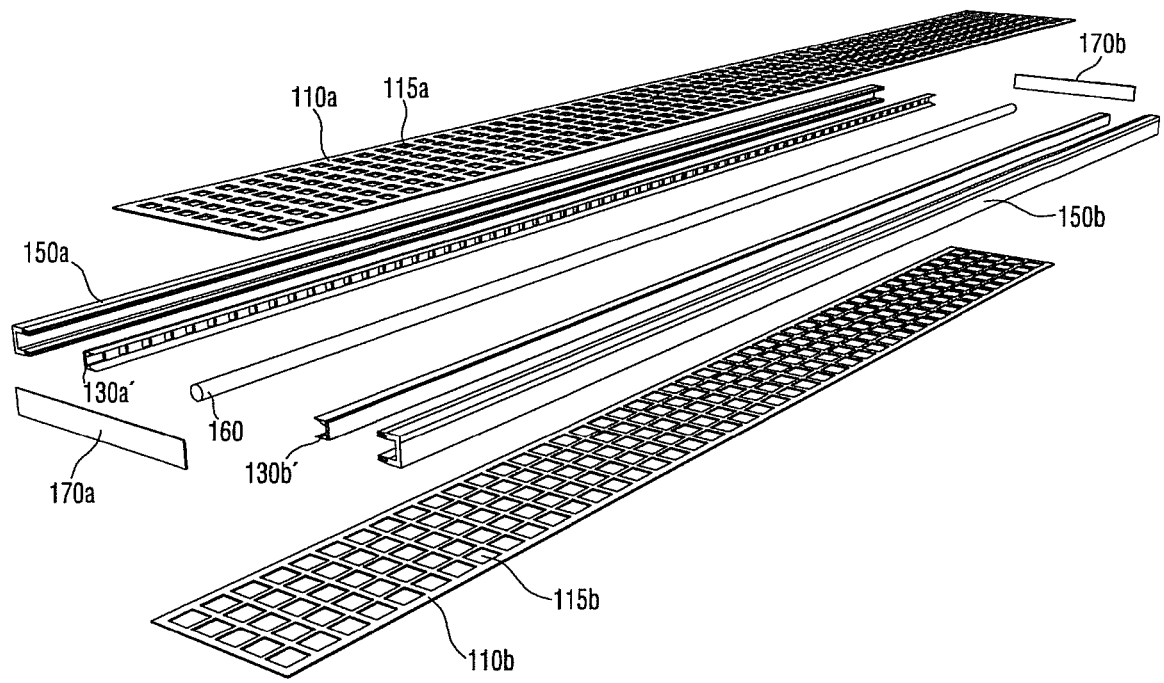
【Figure 21】
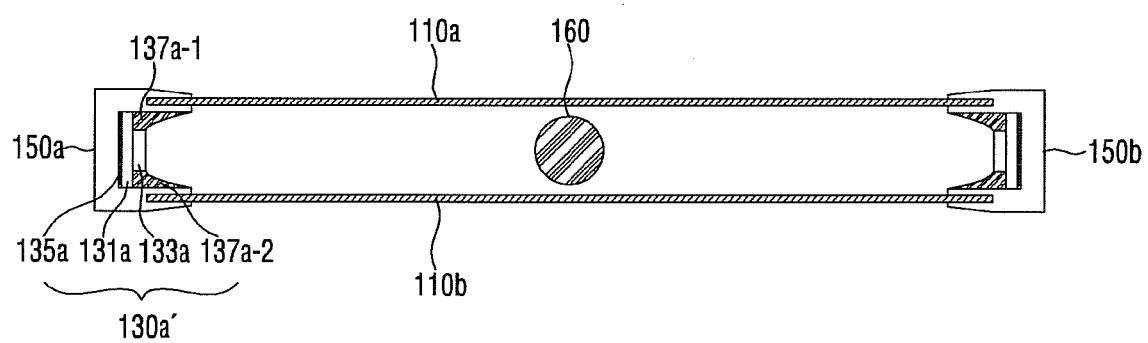
【Figure 22】
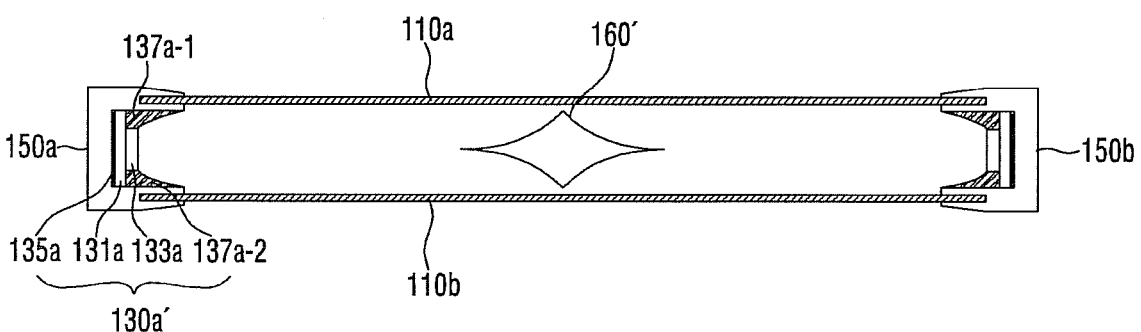

[Figure 23]
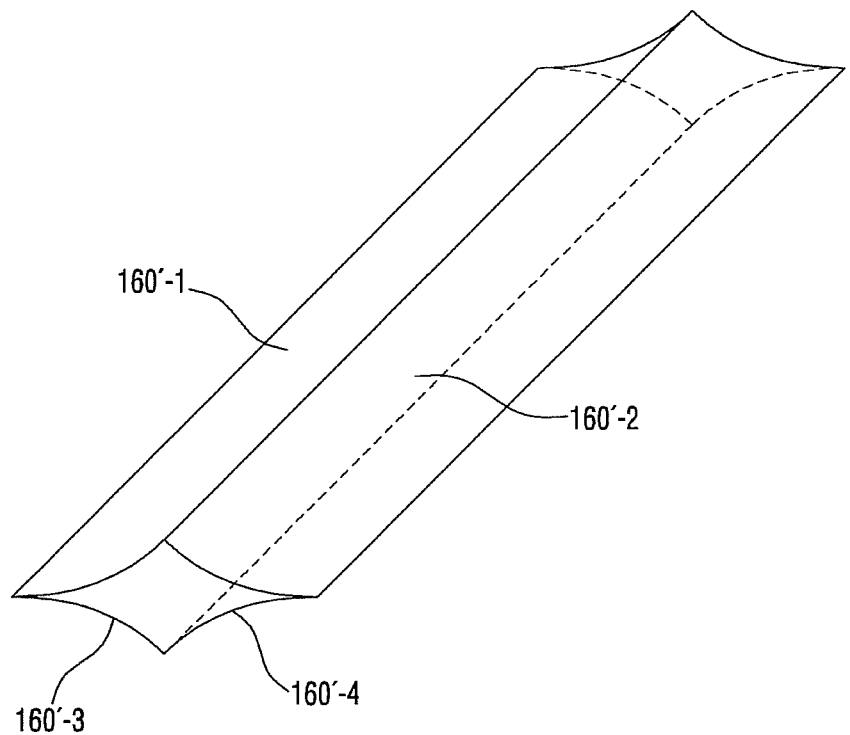
[Figure 24]
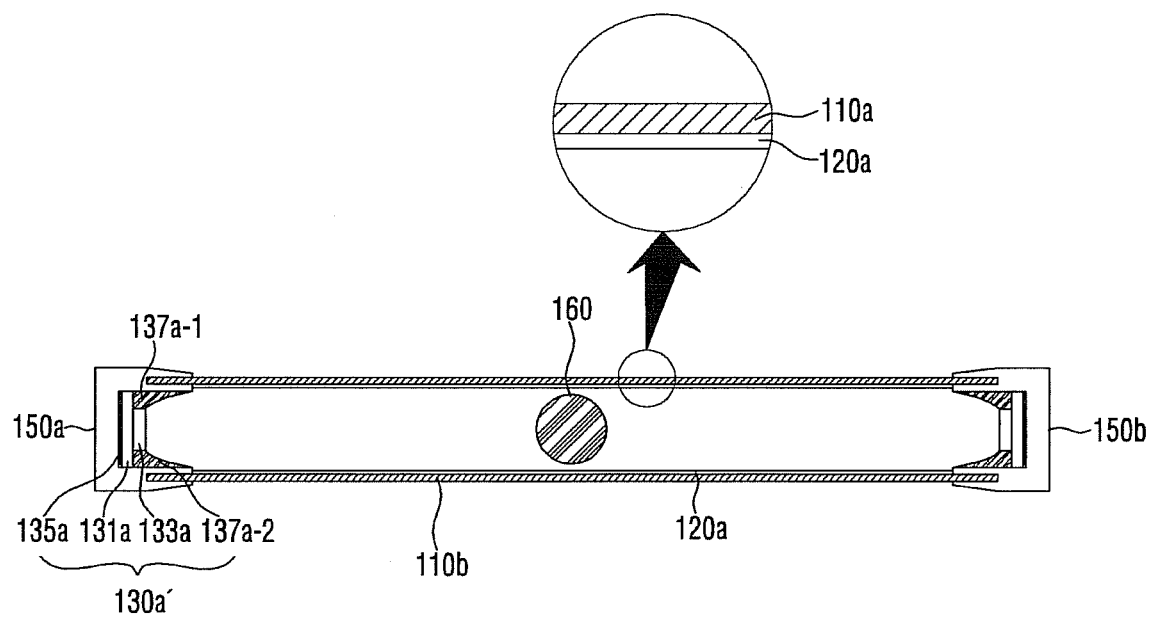

【Figure 25】
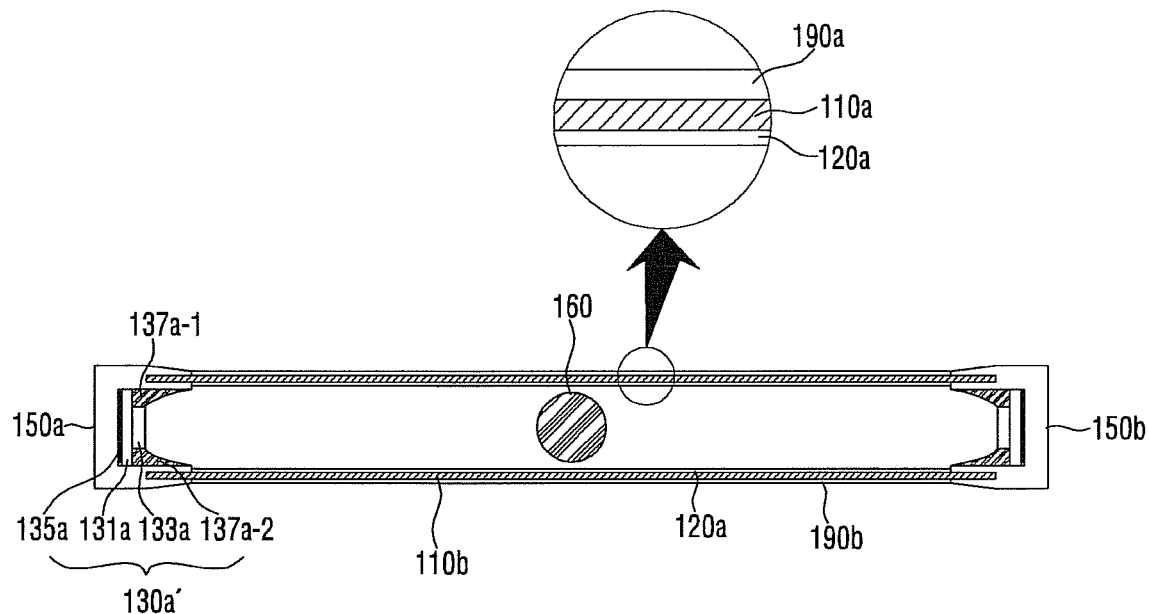
【Figure 26】
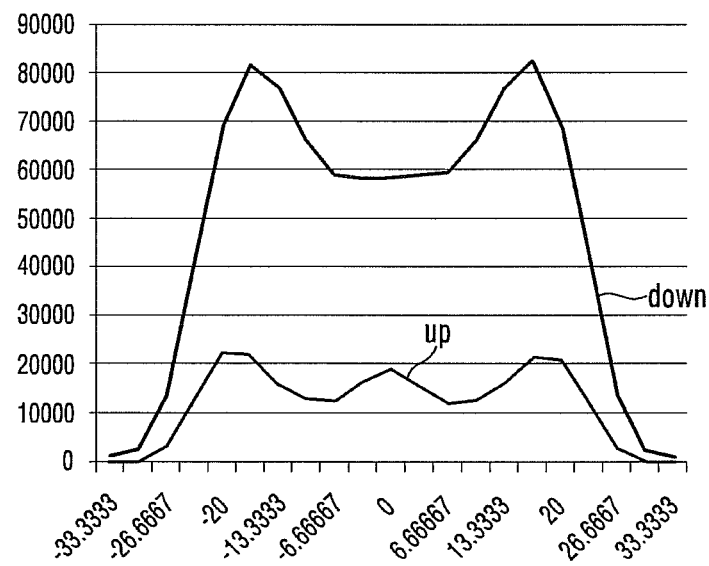

[Figure 27]
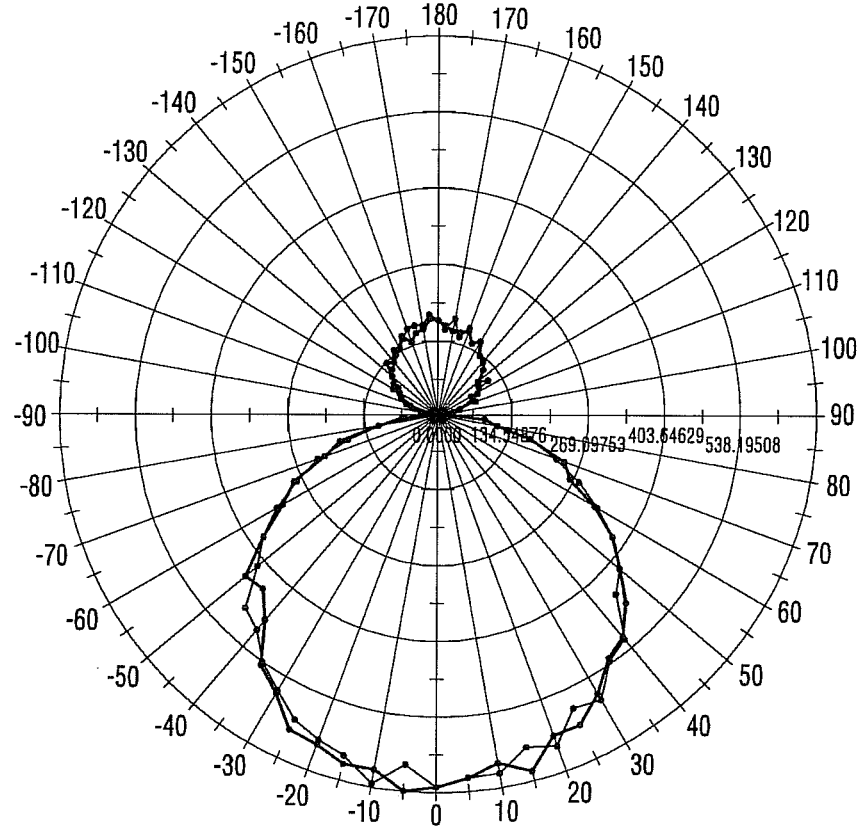
[Figure 28]
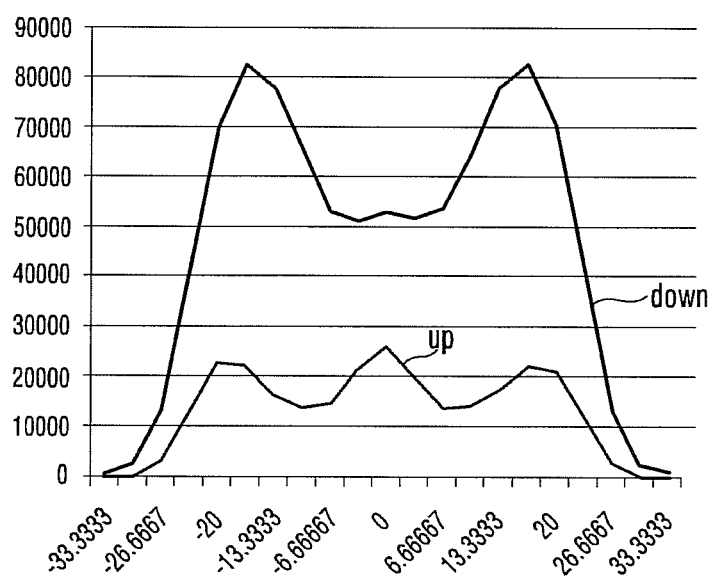

[Figure 29]
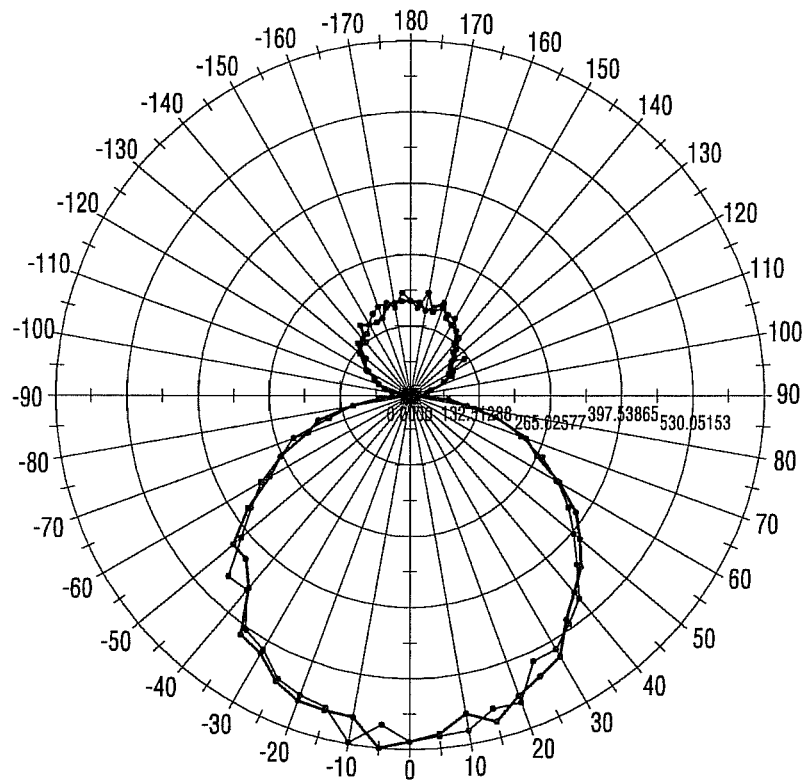
[Figure 30]
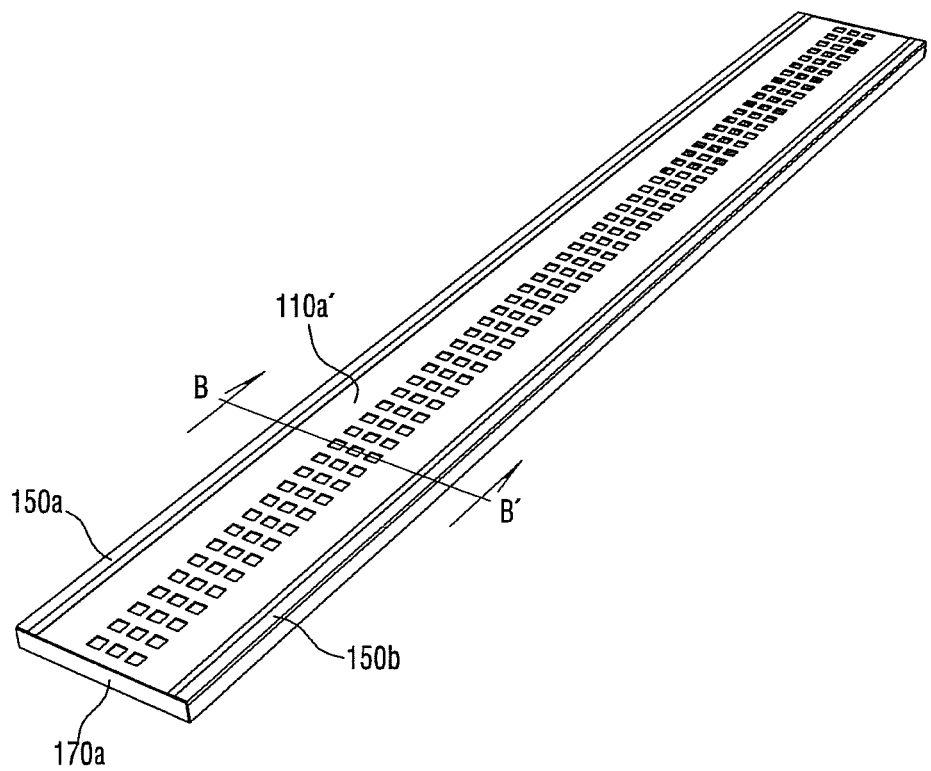

[Figure 31]
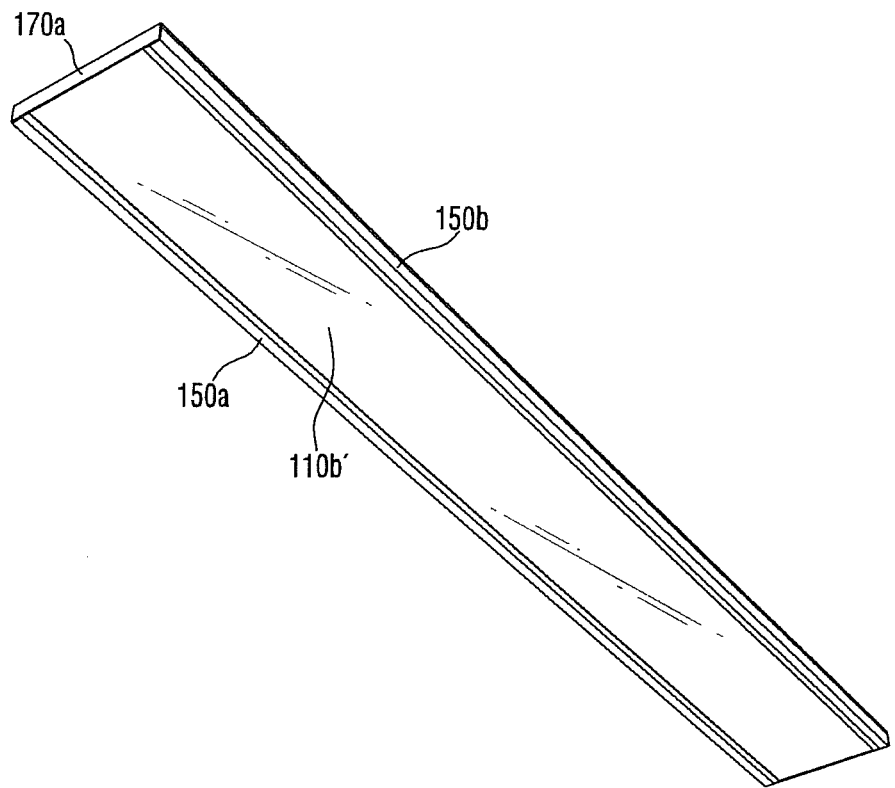
[Figure 32]
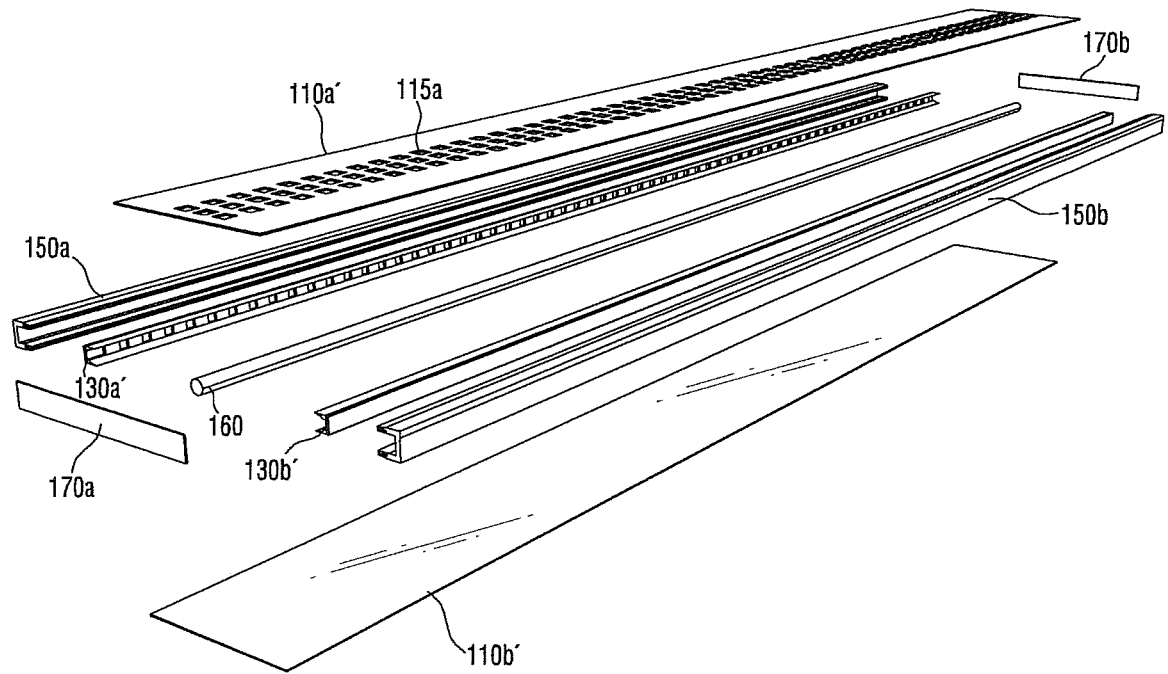

[Figure 33]
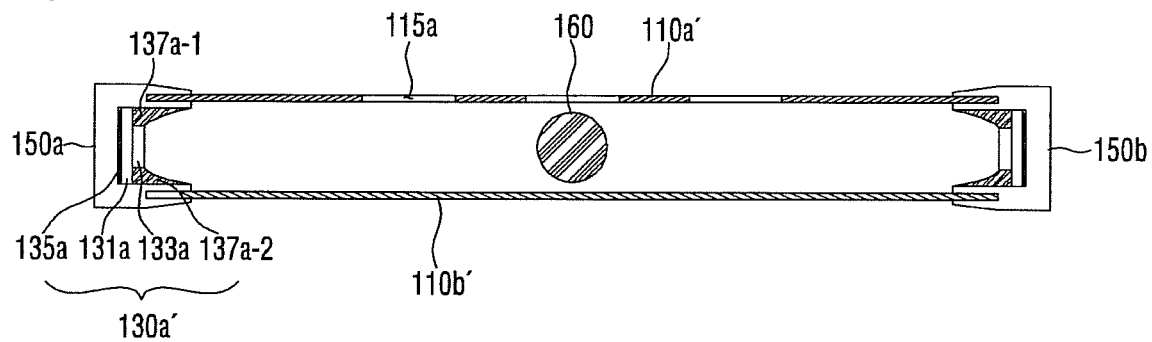
[Figure 34]
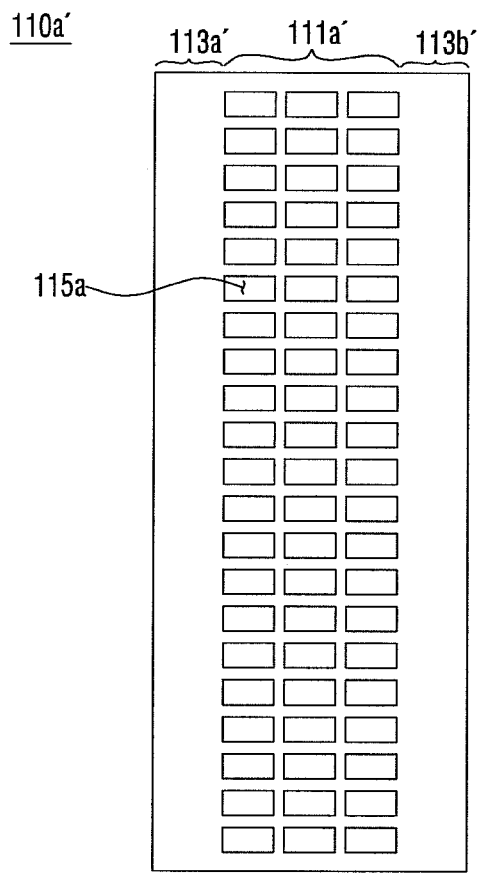

[Figure 35]
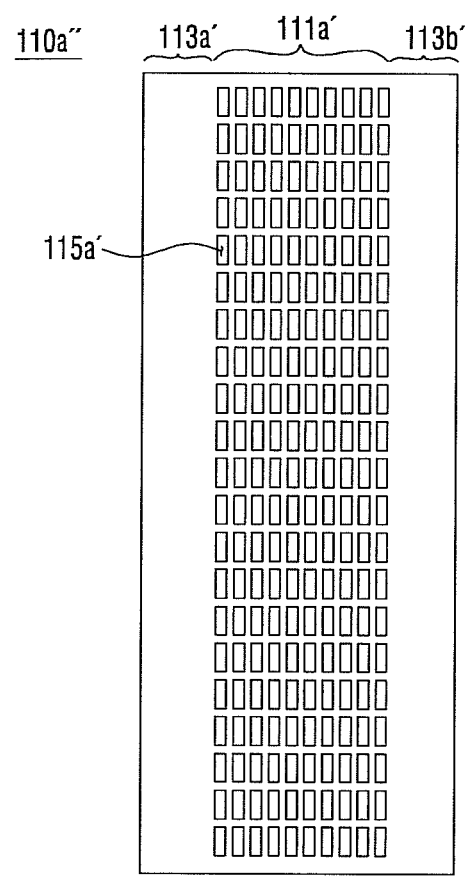

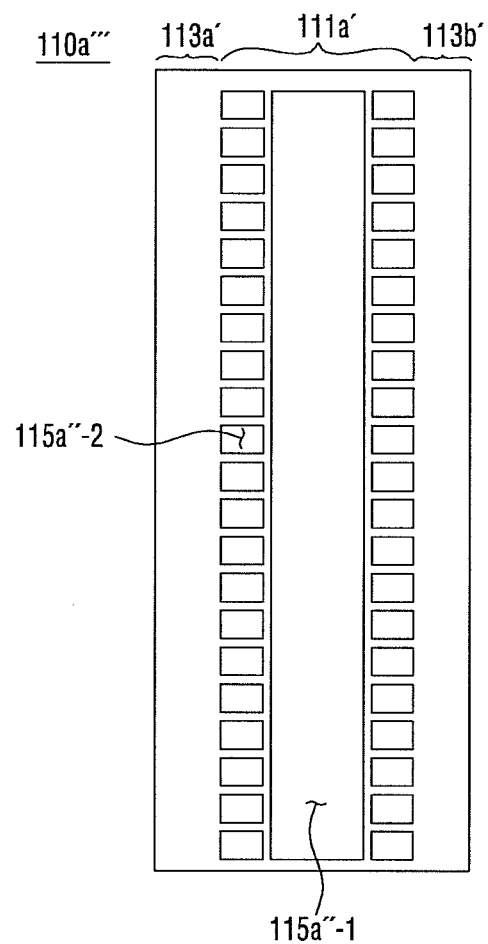
[Figure 36]

【Figure 37】
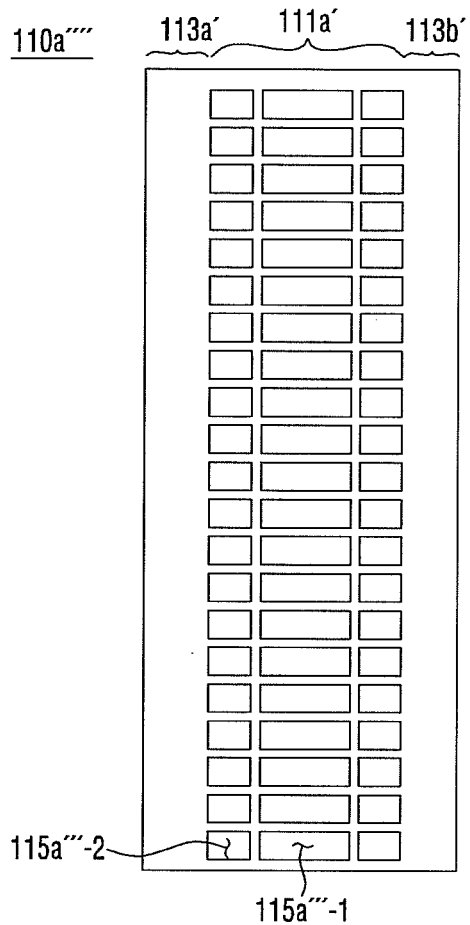
【Figure 38】
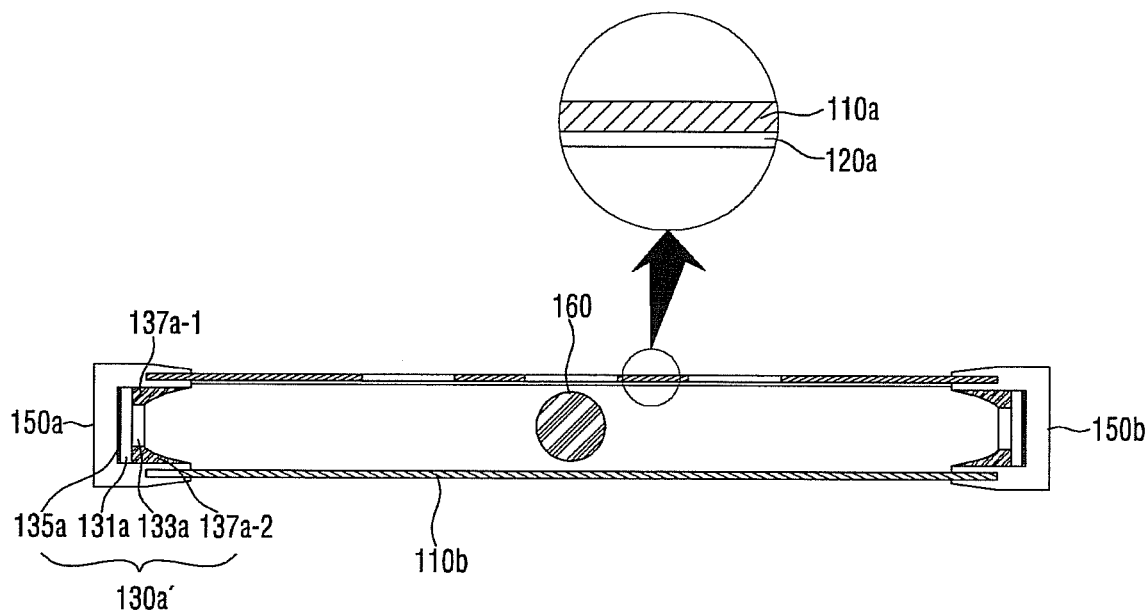

[Figure 39]
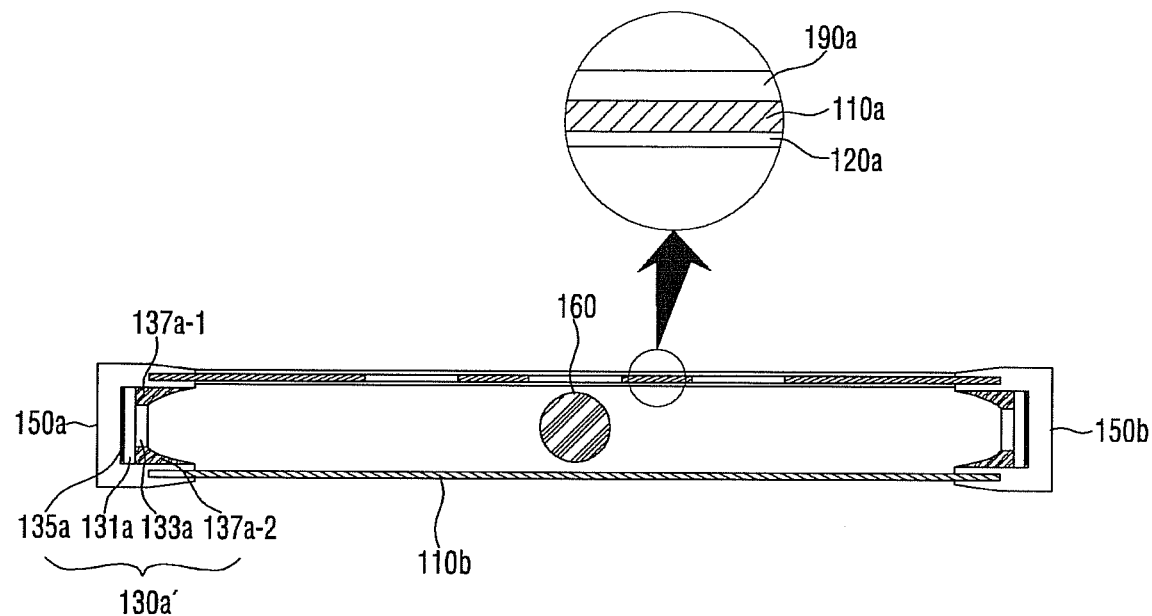
[Figure 40]
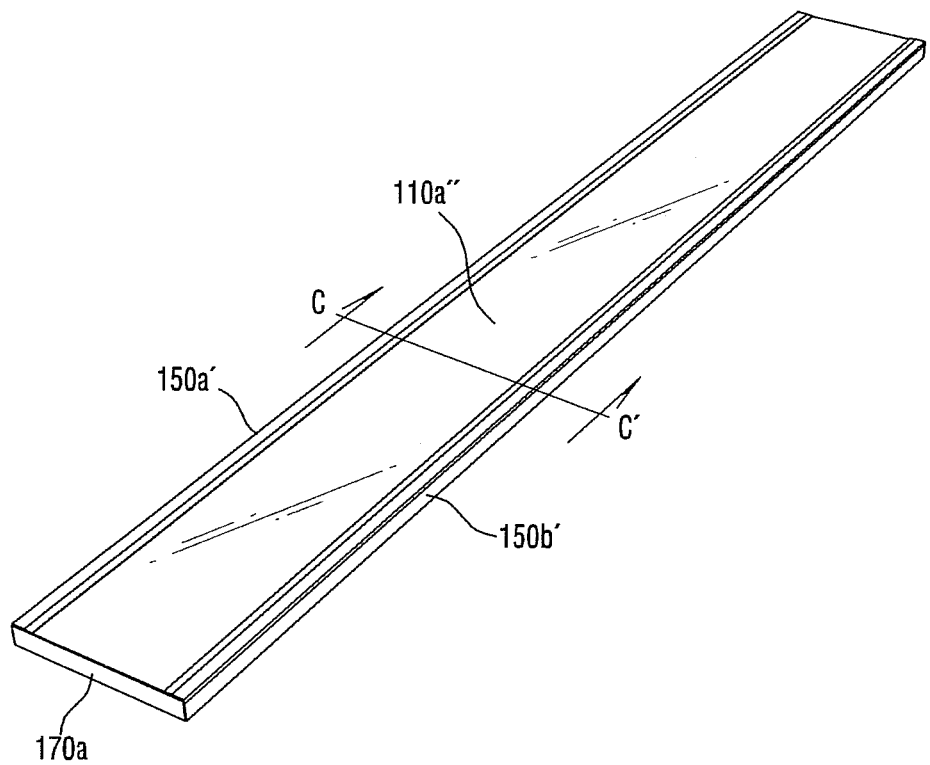

[Figure 41]
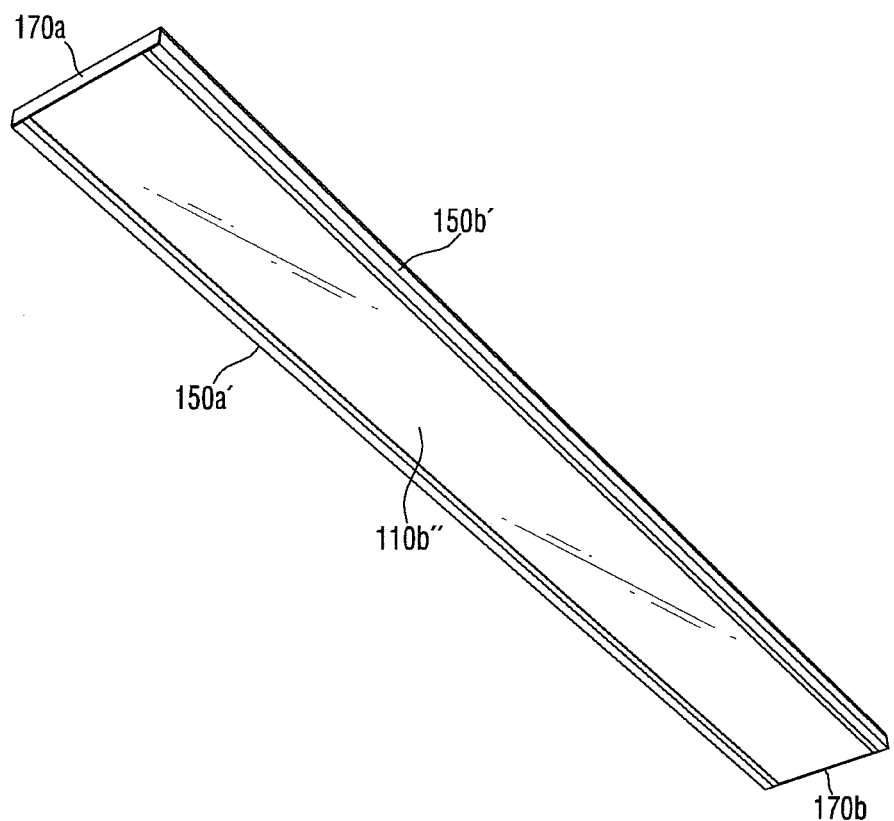
[Figure 42]
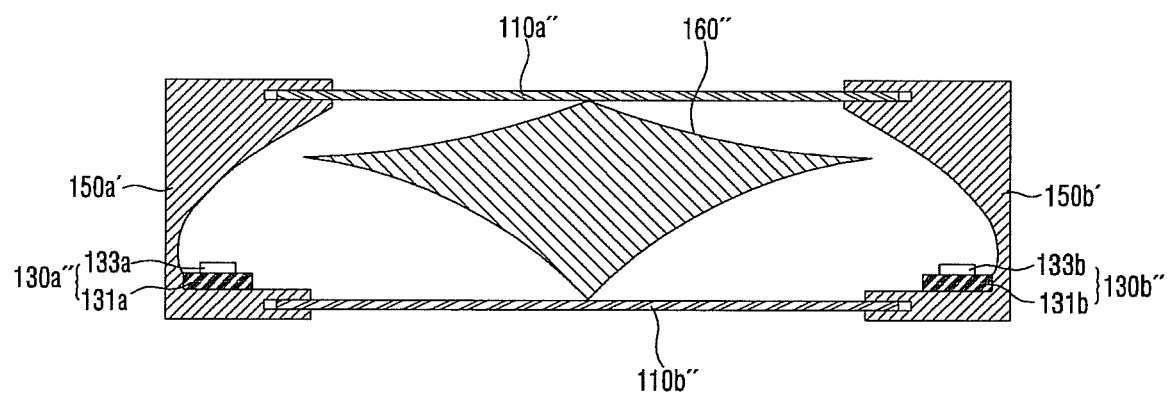

[Figure 43]
150a'
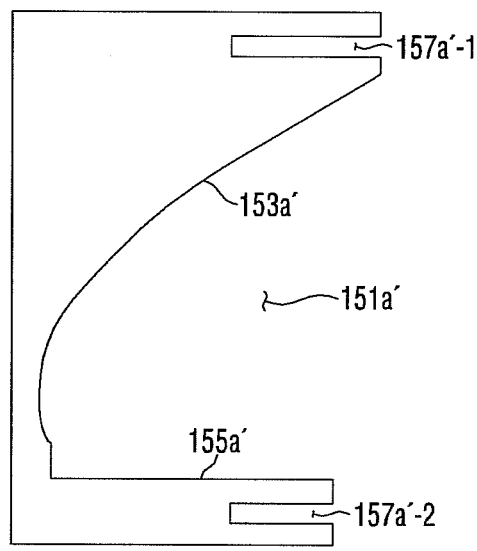
[Figure 44]
160"
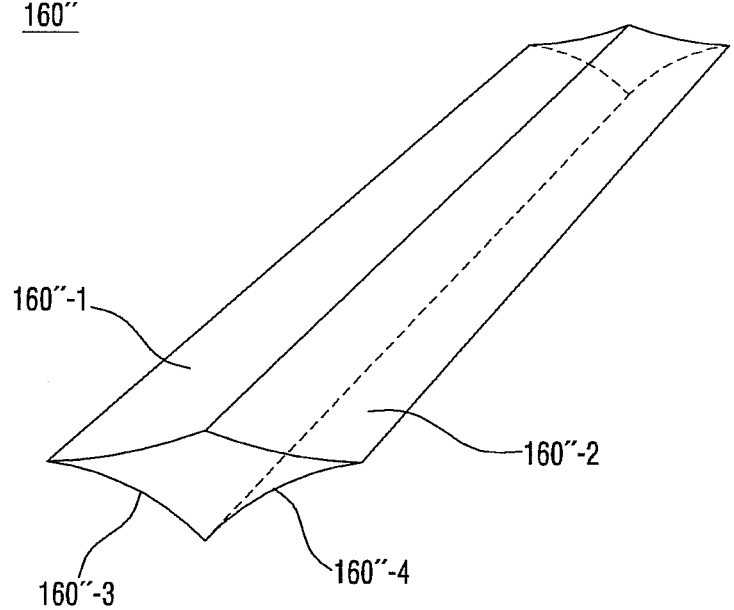

[Figure 45]
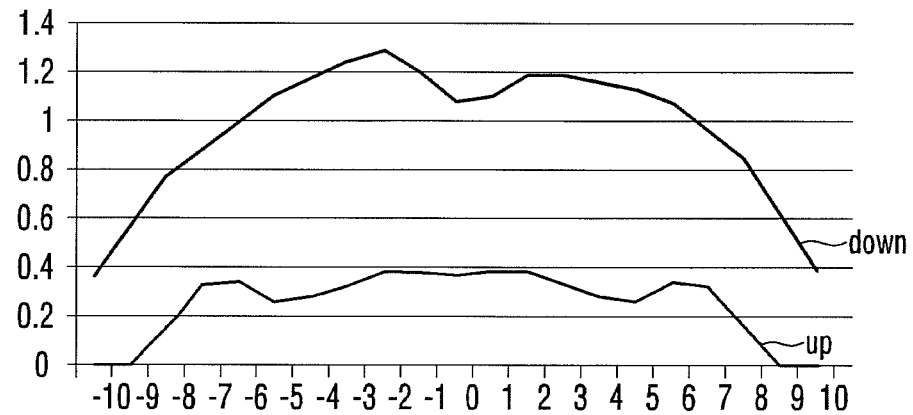
[Figure 46]
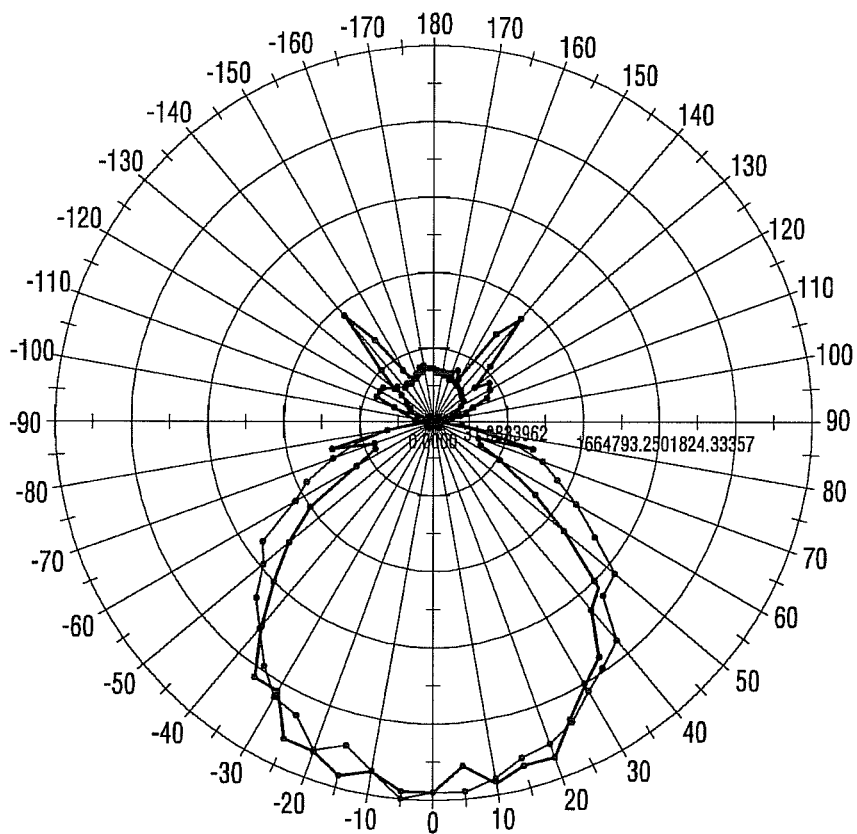

LIGHTING MODULE

CROSS-REFERENCE TO RELATED PATENT APPLICATIONS

The present application is a U.S national stage application under 35 U.S.C. 371 of PCT Application No. PCT/KR2012/005907, filed Jul. 25, 2012, which claims priority to Korean Patent Application Nos. 10-2011-0073857, 10-2011-0073858, 10-2011-0073859, 10-2011-0073860, 10-2011-0073861, and 10-2011-0073862, filed Jul. 26, 2011, the entireties of which are incorporated herein by reference.

TECHNICAL FIELD

The embodiment relates to a lighting module.

BACKGROUND ART

In general, an electric bulb or a fluorescent lamp is commonly used as an indoor or outdoor lighting lamp. However, the electric bulb or the fluorescent lamp has a short life span, so that it should be frequently changed. Moreover, a conventional fluorescent lamp is degraded due to elapse of time for its use. As a result, it is often that its illuminance is gradually decreased.

In order to overcome such problems, a lighting apparatus is now being developed by using a light emitting device (hereinafter, referred to as LED). The LED is easy to control and has a rapid response speed, high electro-optic conversion efficiency, a long life span, low power consumption and high luminance. The LED is also used to create emotional lighting.

DISCLOSURE

Technical Problem

The objective of the present invention is to provide a lighting module which emits light upward and downward at the same time.

The objective of the present invention is to provide a lighting module which is able to control the amount of light emitted upward and the amount of light emitted downward.

The objective of the present invention is to provide a lighting module which is able to control to cause the distribution type of light emitted upward to be different from the distribution type of light emitted downward.

The objective of the present invention is to provide a lighting module which is able to control the internal optical path.

The objective of the present invention is to provide a lighting module which is able to improve the uniformity of internal light.

Technical Solution

A lighting module includes: a first and a second light source units which are disposed to face each other; a first case in which the first light source unit is disposed; a second case in which the second light source unit is disposed; a first plate of which one side is connected to the first case, of which the other side is connected to the second case and which includes a first hole through which light emitted from the first and the second light source units passes; a second plate which is disposed to face the first plate and includes a second hole through which the light emitted from the first and the second light source units passes; and a first and a second optical sheets which are disposed on the first and the second plates.

The first optical sheet diffusely reflects at least a part of the light emitted from the first and the second light source units. The second plate specularly or regularly reflects at least a part of the light emitted from the first and the second light source units.

The size of the first hole of the first plate and the size of the second hole of the second plate are different from each other.

The first plate includes a plurality of the first holes and the second plate includes a plurality of the second holes. The first holes and the second holes are disposed uniformly or non-uniformly.

The first light source unit includes a substrate and a light emitting device disposed on the substrate. The first case includes a base on which the substrate is disposed and an upper case and a lower case, both of which are disposed to face each other. The upper case is coupled to one side of the first plate. The lower case is coupled to one side of the second plate.

The lighting module further includes a heat radiation sheet disposed between the substrate of the light source unit and the base of the case.

The lighting module further includes a first and a second diffusion plates which are disposed on the outer surface of the first and the second plates.

The lighting module further includes a first and a second end caps which are connected to the first and the second plates and the first and the second cases.

The lighting module further includes a reflective member which is disposed in the first case and reflects the light emitted from the first light source unit toward the second light source unit.

The first light source unit includes a substrate and a light emitting device disposed on the substrate. The reflective member includes a first reflective member and a second reflective member. The first reflective member is disposed on one side of the light emitting device. The second reflective member is disposed on the other side of the light emitting device.

A reflective surface of the first reflective member and a reflective surface of the second reflective member are symmetrical or asymmetrical to each other.

The reflective surface of the first reflective member and the reflective surface of the second reflective member are a hyperbola or an ellipse.

The lighting module further includes an optical member which is disposed in the first case and collects the light emitted from the first light source unit toward the second light source unit.

The optical member includes a fluorescent material.

The first light source unit includes a substrate and a light emitting device disposed on the substrate. The optical member is a lens disposed on the substrate of the first light source unit.

The lighting module further includes a reflector which is disposed between the first light source unit and the second light source unit and includes a reflective surface reflecting the light emitted from the first and the second light source units toward the first and the second plates.

The reflective surface of the reflector has a predetermined curvature.

The reflector includes a plurality of the reflective surfaces. The plurality of the reflective surfaces have the same curvature or mutually different curvatures.

The reflector has a cylindrical shape or a polygonal box shape.

A lighting module includes: a first and a second light source units which are disposed to face each other; a first case in which the first light source unit is disposed; a second case in which the second light source unit is disposed; a plate of which one side is connected to the first case, of which the other side is connected to the second case and which includes a plurality of holes through which light emitted from the first and the second light source units passes; an optical plate which is disposed to face the plate and emits the light emitted from the first and the second light source units; and an optical sheet disposed on the plate.

The plate includes both a central portion including the hole and an outer edge disposed on both sides of the central portion. The inner surface of the outer edge is a reflective surface reflecting the light emitted from the first and the second light source units.

The lighting module further includes a reflector which is disposed between the first light source unit and the second light source unit and reflects the light emitted from the first and the second light source units toward the first and the second plates.

The optical sheet diffusely reflects incident light.

The optical plate diffuses or excites incident light.

A lighting module includes: a first and a second light source units which are disposed to face each other; a first case in which the first light source unit is disposed and which includes a first reflective surface reflecting light emitted from the first light source unit; a second case in which the second light source unit is disposed and which includes a second reflective surface reflecting light emitted from the second light source unit; a first optical plate of which one side is connected to the first case, of which the other side is connected to the second case and which emits light provided by the first case; and a second optical plate which is disposed to face the first optical plate and emits light provided by the second case.

The lighting module further includes a reflector which is disposed between the first case and the second case and reflects the light provided by the first and the second cases toward the first and the second optical plates.

The reflector includes a first reflective surface and a second reflective surface. The first reflective surface reflects incident light to the first optical plate. The second reflective surface reflects the incident light to the second optical plates.

The first reflective surface of the reflector has a curvature different from that of the second reflective surface of the reflector.

The longest distance from the first plate to the first reflective surface of the reflector is different from the longest distance from the second plate to the second reflective surface of the reflector.

The first and the second optical plates diffuse or excite incident light.

The first reflective surface of the first case converts incident light into parallel light.

The first reflective surface of the first case is a paraboloid.

The first case includes a disposition surface on which the first light source is disposed. The disposition surface is parallel with the inner surface of the second optical plate.

Advantageous Effects

A lighting module according to the embodiment is able to emit light upward and downward at the same time.

A lighting module according to the embodiment is able to control the amount of light emitted upward and the amount of light emitted downward.

A lighting module according to the embodiment is able to control to cause the distribution type of light emitted upward to be different from the distribution type of light emitted downward.

A lighting module according to the embodiment is able to control the internal optical path.

A lighting module according to the embodiment is able to improve the uniformity of internal light.

DESCRIPTION OF DRAWINGS

FIG. 1 is a top perspective view of a lighting module according to a first embodiment;

FIG. 2 is a bottom perspective view of the lighting module shown in FIG. 1;

FIG. 3 is an exploded perspective view of the lighting module shown in FIG. 1;

FIG. 4 is a cross sectional view taken along line A-A' of FIG. 1;

FIG. 5 is a view showing an enlarged first case shown in FIG. 4

FIG. 6 is a cross sectional view taken along line A-A' of FIG. 1;

FIG. 7 is a cross sectional view taken along line A-A' of FIG. 1;

FIGS. 8 to 9 are graphs showing optical characteristics of the lighting module shown in FIG. 7;

FIG. 10 is an exploded perspective view of a lighting module according to a second embodiment;

FIG. 11 is a cross sectional view of the lighting module shown in FIG. 10;

FIG. 12 is a cross sectional view showing a modified example of the lighting module shown in FIG. 11;

FIG. 13 is a cross sectional view showing another modified example of the lighting module shown in FIG. 11;

FIGS. 14 to 15 are graphs showing optical characteristics of the lighting module shown in FIG. 13;

FIG. 16 is an exploded perspective view of a lighting module according to a third embodiment;

FIG. 17 is a cross sectional view of the lighting module shown in FIG. 16;

FIG. 18 is a cross sectional view showing a modified example of the lighting module shown in FIG. 17;

FIG. 19 is a cross sectional view showing another modified example of the lighting module shown in FIG. 17;

FIG. 20 is an exploded perspective view of a lighting module according to a fourth embodiment;

FIG. 21 is a cross sectional view of the lighting module shown in FIG. 20;

FIG. 22 is a cross sectional view showing another example of the lighting module shown in FIG. 21 according to the fourth embodiment;

FIG. 23 is a perspective view of only a reflector shown in FIG. 22;

FIG. 24 is a cross sectional view showing a modified example of the lighting module shown in FIG. 21;

FIG. 25 is a cross sectional view showing another modified example of the lighting module shown in FIG. 21;

FIGS. 26 and 27 are graphs showing optical characteristics of the lighting module shown in FIG. 25;

FIGS. 28 and 29 are graphs showing optical characteristics when the reflector of the lighting module shown in FIG. 25 is replaced by the reflector shown in FIG. 22;

FIG. 30 is a top perspective view of a lighting module according to a fifth embodiment;

FIG. 31 is a bottom perspective view of the lighting module shown in FIG. 30;

FIG. 32 is an exploded perspective view of the lighting module shown in FIG. 30;

FIG. 33 is a cross sectional view taken along line B-B' of FIG. 30;

FIG. 34 is a front view showing the inner surface of a first plate shown in FIG. 30;

FIGS. 35 to 37 are front views showing modified examples of the first plate shown in FIG. 34;

FIG. 38 is a cross sectional view showing a modified example of the lighting module shown in FIG. 33;

FIG. 39 is a cross sectional view showing another modified example of the lighting module shown in FIG. 33;

FIG. 40 is a top perspective view of a lighting module according to a sixth embodiment;

FIG. 41 is a bottom perspective view of the lighting module shown in FIG. 40;

FIG. 42 is a cross sectional view taken along line C-C' of FIG. 40;

FIG. 43 is a view showing only an enlarged first case shown in FIG. 42;

FIG. 44 is a perspective view of only a reflector shown in FIG. 42;

FIGS. 45 to 46 are graphs showing optical characteristics of the lighting module shown in FIG. 42.

MODE FOR INVENTION

A thickness or size of each layer is magnified, omitted or schematically shown for the purpose of convenience and clearness of description. The size of each component does not necessarily mean its actual size.

In description of embodiments of the present invention, when it is mentioned that an element is formed "on" or "under" another element, it means that the mention includes a case where two elements are formed directly contacting with each other or are formed such that at least one separate element is interposed between the two elements. The "on" and "under" will be described to include the upward and downward directions based on one element.

Hereafter, various lighting modules will be described with reference to the accompanying drawings.

First Embodiment

FIG. 1 is a top perspective view of a lighting module according to a first embodiment. FIG. 2 is a bottom perspective view of the lighting module shown in FIG. 1. FIG. 3 is an exploded perspective view of the lighting module shown in FIG. 10. FIG. 4 is a cross sectional view taken along line A-A' of FIG. 1.

Referring to FIGS. 1 to 4, the lighting module according to the first embodiment may include a first and a second plates 110a and 110b, a first and a second light source units 130a and 130b, a first and a second cases 150a and 150b, and a first and a second end caps 170a and 170b.

For convenience of description, the first and the second cases 150a and 150b will be described first.

Referring to FIGS. 1 to 4, the first case 150a receives the first light source unit 130a. The second case 150b receives the second light source unit 130b. The first case 150a receives one sides of the first and the second plates 110a and 110b. The second case 150b also receives the other sides of the first and the second plates 110a and 110b. Therefore, the first and the second light source units 130a and 130b and the first and the second plates 110a and 110b are disposed between the first case 150a and the second case 150b.

The first and the second cases 150a and 150b may be formed of a material capable of easily radiating heat generated from the first and the second light source units 130a and 130b, for example, Al, an alloy including Al and the like.

Hereafter, the first case 150a will be described in detail with reference to the drawings together with FIG. 5. Here, since the first case 150a is the same as the second case 150b, a description of the second case 150b will be replaced by the following description of the first case 150a.

FIG. 5 is a view showing the enlarged first case 150a shown in FIG. 4.

Referring to FIGS. 1 to 5, the first case 150a may include a base 151a, an upper case 153a and a lower case 155a. The upper case 153a and the lower case 155a may be coupled to the base 151a by using a screw and the like. The base 151a, the upper case 153a and the lower case 155a may be integrally formed with each other and form the first case 150a.

The base 151a may have a plate shape extending in one direction and having a predetermined depth.

The base 151a has an inner surface and an outer surface. The first light source unit 130a is disposed on the inner surface of the base 151a. The outer surface of the base 151a is exposed outward.

The upper case 153a is connected to one side of the base 151a. The upper case 153a may have a plate shape extending in one direction and having a predetermined depth.

The upper case 153a may have an outer surface, an inner surface and a groove 153a-1. The outer surface of the upper case 153a is exposed outward. The groove 153a-1 receives one side of the first plate 110a. The inner surface of the upper case 153a faces the inner surface of the lower case 155a. An angle formed by the inner surfaces of the upper case 153a and the base 151a may be substantially close to perpendicular.

The lower case 155a is connected to the other side of the base 151a. The lower case 155a may have a plate shape extending in one direction and having a predetermined depth.

The lower case 155a may have an outer surface, an inner surface and a groove 155a-1. The outer surface of the lower case 155a is exposed outward. The groove 155a-1 receives one side of the second plate 110b. The inner surface of the lower case 155a faces the inner surface of the upper case 153a. An angle formed by the inner surfaces of the lower case 155a and the base 151a may be substantially close to perpendicular.

A receiver 157a is defined by the inner surface of the base 151a, the inner surface of the upper case 153a and the inner surface of the lower case 155a. The receiver 157a receives the first light source unit 130a.

Referring to FIGS. 1 to 4, the first light source unit 130a is received in the first case 150a. Here, the first light source unit 130a may be received in the receiver 157a of the first case 150a shown in FIG. 5 and may be disposed on the inner surface of the base 151a. The second light source unit 130b is received in the second case 150b.

The first light source unit 130a and the second light source unit 130b, both of which are received in the first case 150a and the second case 150b respectively, are disposed to face each other.

Specifically, the first light source unit 130a will be described. Here, since the second light source unit 130b is the same as the first light source unit 130a, a description of the second light source unit 130b will be replaced by the following description of the first light source unit 130a.

The first light source unit 130a may include a substrate 131a and a light emitting device 133a.

A plurality of the light emitting devices 133a are arranged on one side of the substrate 131a in a line. The other side of the substrate 131a is disposed on the inner surface of the base 151a of the first case 150a shown in FIG. 5. The substrate 131a may have a plate shape extending in one direction and having a predetermined depth.

The substrate 131a may include a printed circuit board (PCB), a metal core PCB, a flexible PCB, a ceramic substrate or the like.

The light emitting device 133a may be a light emitting diode (LED).

The plurality of the light emitting devices 133a may emit light having the same color or may emit light having different colors.

The plurality of the light emitting devices 133a may be disposed at a regular interval. The intervals among the plurality of the light emitting devices 133a may be different from each other.

The light emitting device 133a may be a blue light emitting device or a white light emitting device having a high color rendering index (CRI). Synthetic resin including a fluorescent material is molded on a blue light emitting chip, so that the white light emitting device emits white light. Here, the fluorescent material may include at least any one selected from a group consisting of a garnet material (YAG, TAG), a silicate material, a nitride material and an oxynitride material. Though natural light (white light) can be created by allowing the synthetic resin to include only yellow fluorescent material, the synthetic resin may further include a green fluorescent material or a red fluorescent material in order to improve a color rendering index and to reduce a color temperature. When the synthetic resin is mixed with many kinds of fluorescent materials, an addition ratio of the color of the fluorescent material may be formed such that the green fluorescent material is more used than the red fluorescent material, and the yellow fluorescent material is more used than the green fluorescent material. The garnet material, the silicate material and the oxynitride material may be used as the yellow fluorescent material. The silicate material and the oxynitride material may be used as the green fluorescent material. The nitride material may be used as the red fluorescent material. The synthetic resin may be mixed with various kinds of the fluorescent materials or may be configured by a layer including the red fluorescent material, a layer including the green fluorescent material and a layer including the yellow fluorescent material, which are formed separately from each other.

The light emitting devices 133a of the first light source unit 130a are disposed to face the light emitting devices 133b of the second light source unit 130b.

The light emitting devices 133a of the first light source unit 130a may have a color temperature different from that of the light emitting devices 133b of the second light source unit 130b. For example, the plurality of the light emitting devices 133a included in the first light source unit 130a may be a warm white LED, and the light emitting devices 133b included in the second light source unit 130b may be a cool white LED. The warm white LED and the cool white LED emit white light. Since the warm white LED and the cool white LED emit correlated color temperatures respectively and then are able to emit white light mixed with lights, the color rendering index (CRI) representing how close light is to natural sunlight becomes greater. Accordingly, it is possible to prevent the actual color of an object from being distorted and to reduce the fatigue of user's eye.

The first light source unit 130a may further include a heat radiation sheet 135a. The heat radiation sheet 135a is disposed between the substrate 131a and the first case 150a.

Referring to FIGS. 1 to 4, the first and the second plates 110a and 110b are disposed between the first case 150a and the second case 150b.

The first and the second plates 110a and 110b may have a plate shape extending in one direction and having a predetermined depth.

One side of the first plate 110a is connected to the first case 150a. The other side of the first plate 110a is connected to the second case 150b. One side of the second plate 110b is connected to the first case 150a. The other side of the second plate 110b is connected to the second case 150b. Therefore, the first and the second plates 110a and 110b may be disposed to face each other and may be substantially disposed parallel with each other.

The first and the second plates 110a and 110b allow light emitted from the first and the second light source units 130a and 130b to be emitted outwardly. For this purpose, the first and the second plates 110a and 110b may include holes 115a and 115b.

The hole 115a of the first plate 110a penetrates the outer surface and inner surface of the first plate 110a. A plurality of the holes 115a are formed in the first plate 110a. Although the hole 115a has a quadrangular shape in the drawing, the hole 115a may have various shapes without being limited to this. The plurality of the holes 115a may be disposed uniformly or non-uniformly in the first plate 110a. For example, the plurality of the holes 115a may be disposed only in the central portion of the first plate 110a or may be disposed only on the outer edge of the first plate 110a. Also, the plurality of the holes 115a may be disposed more in the central portion than the outer edge of the first plate 110a, or vice versa.

The hole 115b of the second plate 110b penetrates the outer surface and inner surface of the second plate 110b. A plurality of the holes 115b are formed in the second plate 110b. Although the hole 115b has a quadrangular shape in the drawing, the hole 115b may have various shapes without being limited to this. The plurality of the holes 115b may be disposed uniformly or non-uniformly in the second plate 110b. For example, the plurality of the holes 115b may be disposed only in the central portion of the second plate 110b or may be disposed only on the outer edge of the second plate 110b. Also, the plurality of the holes 115b may be disposed more in the central portion than the outer edge of the second plate 110b, or vice versa.

The size of the hole 115a of the first plate 110a may be the same as that of the hole 115b of the second plate 110b or may not as shown in the drawing.

When the size of the hole 115a of the first plate 110a is the same as that of the hole 115b of the second plate 110b, the amount of light emitted through the holes 115a of the first plate 110a is the same as the amount of light emitted through the holes 115b of the second plate 110b.

When the size of the hole 115a of the first plate 110a is different from the size of the hole 115b of the second plate 110b, the amount of the light emitted through the holes 115a of the first plate 110a is not the same as the amount of the light emitted through the holes 115b of the second plate 110b.

That is, in the first and the second plates 110a and 110b, one of which has a larger size than the other is able to outwardly emit larger amount of light. The drawing shows that the hole 115b of the second plate 110b is bigger than the hole 115a of the first plate 110a. However, there is no limit to this. The hole 115a of the first plate 110a may be bigger than the hole 115b of the second plate 110b.

Referring to FIGS. 1 to 3, the first and the second end caps 170a and 170b respectively cover two rectangular openings formed by the first and the second cases 150a and 150b and the first and the second plates 110a and 110b.

The first and the second end caps 170a and 170b block light emitted out from both sides and cause the lighting module according to the embodiment to be stably fixed.

The first and the second end caps 170a and 170b may be coupled to the first and the second cases 150a and 150b by means of a coupling means such as a screw and the like. Further, for more stable fixation, the first and the second end caps 170a and 170b may be coupled to the first and the second plates 110a and 110b as well as the first and the second cases 150a and 150b.

FIG. 6 is a cross sectional view taken along line A-A' of FIG. 1. FIG. 6 shows a modified example of the lighting module shown in FIG. 4.

The lighting module shown in FIG. 6 is formed by further adding a first optical sheet 120a and a second optical sheet 120b to the lighting module shown in FIG. 4. Therefore, hereafter only the first optical sheet 120a and the second optical sheet 120b will be described in detail and descriptions of other components will be replaced by the foregoing description. Here, the first and the second plates 110a and 110b may or may not have a plurality of holes.

The first and the second optical sheets 120a and 120b are disposed on the inner surfaces of the first and the second plates 110a and 110b respectively. The first and the second optical sheets 120a and 120b are able to reflect or diffuse the light emitted from the first and the second light source units 130a and 130b respectively.

The first optical sheet 120a is disposed on the inner surface of the first plate 110a and diffuses the light emitted from the first and the second light source units 130a and 130b. Particularly, the first optical sheet 120a is able to diffusely reflect the light emitted from the first and the second light source units 130a and 130b.

When the first optical sheet 120a diffusely reflects the light, large amount of light is reflected toward the second plate 110b and uniformity of the light heading toward the second plate 110b can be improved.

The second optical sheet 120b is disposed on the inner surface of the second plate 110b and diffuses the light emitted from the first and the second light source units 130a and 130b. Particularly, the second optical sheet 120b is able to specularly or regularly reflect the light emitted from the first and the second light source units 130a and 130b.

When the second optical sheet 120b specularly or regularly reflect the light, the light emitted from the first and the second light source units 130a and 130b can be widely diffused toward the first plate 110a.

In particular, when the first optical sheet 120a diffusely reflect the light and the second optical sheet 120b specularly or regularly reflect the light, it is advantageous to emit the larger amount of the light through the second optical sheet 120b than the first optical sheet 120a.

The first and the second optical sheets 120a and 120b may further include a fluorescent material. When the first and the second optical sheets 120a and 120b include a fluorescent material, the color rendering index (CRI) of the light emitted through the first and the second plates 110a and 110b can be improved.

The first and the second optical sheets 120a and 120b may also further include an additive. The additive disperses uniformly the fluorescent material within the first and the second optical sheets 120a and 120b. The first and the second optical sheets 120a and 120b may also further include a diffusing agent. The diffusing agent may increase the excitation ratio of the fluorescent material.

Meanwhile, the first and the second optical sheets 120a and 120b may be a first and a second optical layers 120a and 120b. The first optical layer 120a may be coated on the inner surface of the first plate 110a. The second optical layer 120b may be coated on the inner surface of the second plate 110b. The function of the first optical layer 120a is the same as the above-mentioned function of the first optical sheet 120a. The function of the second optical layer 120b is the same as the above-mentioned function of the second optical sheet 120b.

FIG. 7 is a cross sectional view taken along line A-A' of FIG. 1. FIG. 7 shows another modified example of the lighting module shown in FIG. 4.

The lighting module shown in FIG. 7 is formed by further adding a first and a second diffusion plates 190a and 190b to the lighting module shown in FIG. 6. Therefore, only the first and the second diffusion plates 190a and 190b will be described and descriptions of the other components will be replaced by the foregoing description.

Here, the first and the second plates 110a and 110b may or may not have a plurality of holes.

The first diffusion plate 190a may be disposed on the outer surface of the first plate 110a. The second diffusion plate 190b may be disposed on the outer surface of the second plate 110b. The first and the second diffusion plates 190a and 190b diffuse the light which has passed through the first and the second plates 110a and 110b. In other words, the first and the second diffusion plates 190a and 190b intend to apply Lambertian distribution to the distribution of the light emitted from the lighting module according to the embodiment.

The first and the second diffusion plates 190a and 190b are also able to prevent users from seeing hot spots of the first and the second light source units 130a and 130b, which are projected on the inner surface of the first plate 110a, through the second plate 110b from the outside.

FIGS. 8 and 9 are graphs showing optical characteristics of the lighting module shown in FIG. 7.

In the graph shown in FIG. 8, the horizontal axis represents positions and the vertical axis represents brightness (lux). Here, '0' of the horizontal axis corresponds to a middle position between the first light source unit 130a and the second light source unit 130b, both of which are shown in FIG. 7.

Referring to FIGS. 8 and 9, it can be seen that the lighting module shown in FIG. 7 emits light upward and downward at the same time and the amount of the light emitted downward is larger than the amount of the light emitted upward.

Second Embodiment

FIG. 10 is an exploded perspective view of a lighting module according to a second embodiment. FIG. 11 is a cross sectional view of the lighting module shown in FIG. 10.

Here, the perspective view of the lighting module shown in FIGS. 10 to 11 is the same as that of the lighting module shown in FIGS. 1 and 2. Therefore, the perspective view of the lighting module according to the second embodiment will be replaced by the perspective views shown in FIGS. 1 and 2.

In many configurations of the lighting module according to the second embodiment shown in FIGS. 10 and 11, the same reference numerals will be assigned to the same configurations as those of the lighting module according to the first embodiment shown in FIGS. 1 and 5. Therefore, in many configurations of the lighting module according to the second embodiment, descriptions of the same configurations as those of the lighting module according to the first embodiment will be replaced by the descriptions of the lighting module according to the first embodiment.

Hereafter, the following description will focus on differences between the lighting module according to the second embodiment and the lighting module according to the first embodiment.

The lighting module according to the second embodiment shown in FIGS. 10 to 11 may include the first and the second plates 110a and 110b, a first and a second light source units 130a' and 130b', the first and the second cases 150a and 150b and the first and the second end caps 170a and 170b.

The first and the second light source units 130a' and 130b' of the lighting module according to the second embodiment shown in FIGS. 10 to 11 are different from the first and the second light source units 130a and 130b shown in FIGS. 1 to 5.

Specifically, compared with the first light source unit 130a shown in FIGS. 1 to 5, the first light source unit 130a' shown in FIGS. 10 to 11 further includes a first and a second reflective members 137a-1 and 137a-2. In the same manner, the second light source unit 130b' shown in FIGS. 10 to 11 further includes a first and a second reflective members 137b-1 and 137b-2. Since the first and the second reflective members 137b-1 and 137b-2 of the second light source unit 130b' is the same as the first and the second reflective members 137a-1 and 137a-2 of the first light source unit 130a', only the first light source unit 130a' will be described in detail in the following description.

The first and the second reflective members 137a-1 and 137a-2 are disposed on the substrate 131a. The light emitting device 133a is disposed between the first and the second reflective members 137a-1 and 137a-2. The first and the second reflective members 137a-1 and 137a-2 are received in the receiver 157a of the first case 150a. The first reflective member 137a-1 is disposed on the inner surface of the upper case 153a of the first case 150a. The second reflective member 137a-2 is disposed on the inner surface of the lower case 155a of the first case 150a.

The first and the second reflective members 137a-1 and 137a-2 include a reflective surface reflecting light emitted from the light emitting device 133a. The reflective surface of the first reflective member 137a-1 may be symmetrical to the reflective surface of the second reflective member 137a-2.

The cross section of the reflective surface of the first reflective member 137a-1 and the cross section of the reflective surface of the second reflective member 137a-2 may be a portion of a hyperbola. In this case, the light emitted from the light emitting device 133a may be emitted along the reflective surfaces of the first and the second reflective members 137a-1 and 137a-2. Also, the cross section of the reflective surface of the first reflective member 137a-1 and the cross section of the reflective surface of the second reflective member 137a-2 may be a portion of an ellipse. In this case, the light emitted from the light emitting device 133a may be reflected by the reflective surfaces of the first and the second reflective members 137a-1 and 137a-2 and then may be converged to any one focus.

Meanwhile, the reflective surface of the first reflective member 137a-1 may be asymmetrical to the reflective surface of the second reflective member 137a-2. That is, the cross section of the reflective surface of the first reflective member 137a-1 may be a hyperbola and the reflective surface of the second reflective member 137a-2 may be an ellipse. Also, when the cross section of the reflective surface of the first reflective member 137a-1 may be an ellipse and the reflective surface of the second reflective member 137a-2 may be also an ellipse, the two ellipses may be different from each other. In this case, the light emitted from the light emitting device 133a may be converged to the foci of the ellipses respectively.

FIG. 12 is a cross sectional view showing a modified example of the lighting module shown in FIG. 11.

Specifically, the lighting module shown in FIG. 12 is formed by further adding the first and the second optical sheets 120a and 120b to the lighting module shown in FIG. 11. Since the first and the second optical sheets 120a and 120b are the same as the first and the second optical sheets 120a and 120b shown in FIG. 6, detailed description thereof will be replaced by the foregoing description of FIG. 6.

FIG. 13 is a cross sectional view showing another modified example of the lighting module shown in FIG. 11.

The lighting module shown in FIG. 13 is formed by further adding the first and the second diffusion plates 190a and 190b to the lighting module shown in FIG. 12. Since the first and the second diffusion plates 190a and 190b are the same as the first and the second diffusion plates 190a and 190b shown in FIG. 7, detailed description thereof will be replaced by the foregoing description of FIG. 7.

FIGS. 14 to 15 are graphs showing optical characteristics of the lighting module shown in FIG. 13.

In the graph shown in FIG. 14, the horizontal axis represents positions and the vertical axis represents brightness (lux). Here, '0' of the horizontal axis corresponds to a middle position between the first light source unit 130a' and the second light source unit 130b', both of which are shown in FIG. 13.

Referring to FIGS. 14 and 15, it can be seen that the lighting module shown in FIG. 13 emits light upward and downward at the same time and the amount of the light emitted downward is larger than the amount of the light emitted upward.

Third Embodiment

FIG. 16 is an exploded perspective view of a lighting module according to a third embodiment. FIG. 17 is a cross sectional view of the lighting module shown in FIG. 16.

Here, the perspective view of the lighting module shown in FIGS. 16 to 17 is the same as that of the lighting module shown in FIGS. 1 and 2. Therefore, the perspective view of the lighting module according to the third embodiment will be replaced by the perspective views shown in FIGS. 1 and 2.

In many configurations of the lighting module according to the third embodiment shown in FIGS. 16 and 17, the same reference numerals will be assigned to the same configurations as those of the lighting module according to the first embodiment shown in FIGS. 1 and 5. Therefore, in many configurations of the lighting module according to the third embodiment, descriptions of the same configurations as those of the lighting module according to the first embodiment will be replaced by the descriptions of the lighting module according to the first embodiment.

Hereafter, the following description will focus on differences between the lighting module according to the third embodiment and the lighting module according to the first embodiment.

The lighting module according to the third embodiment shown in FIGS. 16 to 17 may include the first and the second plates 110*a* and 110*b*, a first and a second light source units 130*a*″ and 130*b*″, the first and the second cases 150*a* and 150*b* and the first and the second end caps 170*a* and 170*b*.

The first and the second light source units 130*a*″ and 130*b*″ of the lighting module according to the third embodiment shown in FIGS. 16 to 17 are different from the first and the second light source units 130*a* and 130*b* shown in FIGS. 1 to 5.

Specifically, compared with the first light source unit 130*a* shown in FIGS. 1 to 5, the first light source unit 130*a*″ shown in FIGS. 16 to 17 further includes an optical member 137*a*'. In the same manner, the second light source unit 130*b*″ shown in FIGS. 16 to 17 further includes an optical member 137*b*'. Since the optical member 137*b*' of the second light source unit 130*b*″ is the same as the optical member 137*a*' of the first light source unit 130*a*″, only the first light source unit 130*a*″ will be described in detail in the following description.

The optical member 137*a*' is disposed on the substrate 131*a* to cover the light emitting device 133*a*. The optical member 137*a*' one-to-one corresponds to the light emitting device 133*a*. Also, the optical member 137*a*' is received in the receiver 157*a* of the first case 150*a*.

The optical member 137*a*' collects the light emitted from the light emitting device 133*a*. Specifically, the optical member 137*a*' collects the light emitted from the light emitting device 133*a* in a direction of the second light source unit 130*b*″ received in the second case 150*b*.

The optical member 137*a*' may be, for example, a lens. The lens 137*a*' may have a structure covering the light emitting device 133*a*. Specifically, the light incident surface of the lens 137*a*' has a groove formed therewithin and the light emitting device 133*a* may be disposed in the groove. The lens 137*a*' may have a shape of which the diameter increases toward the light emitting surface from the light incident surface.

The optical member 137*a*' may include a fluorescent material for exciting the light emitted from the light emitting device 133*a*. The fluorescent material may include at least any one selected from a group consisting of a garnet material (YAG, TAG), a silicate material, a nitride material and an oxynitride material.

The optical member 137*a*' may further include an additive. The additive disperses uniformly the fluorescent material within the optical member 137*a*'. The optical member 137*a*' may also further include a diffusing agent. The diffusing agent may increase the excitation ratio of the fluorescent material.

FIG. 18 is a cross sectional view showing a modified example of the lighting module shown in FIG. 17.

Specifically, the lighting module shown in FIG. 18 is formed by further adding the first optical sheet 120*a* and the second optical sheet 120*b* to the lighting module shown in FIG. 17. Since the first and the second optical sheets 120*a* and 120*b* are the same as the first and the second optical sheets 120*a* and 120*b* shown in FIG. 6, detailed description thereof will be replaced by the foregoing description of FIG. 6.

FIG. 19 is a cross sectional view showing another modified example of the lighting module shown in FIG. 17.

The lighting module shown in FIG. 19 is formed by further adding the first and the second diffusion plates 190*a* and 190*b* to the lighting module shown in FIG. 18. Since the first and the second diffusion plates 190*a* and 190*b* are the same as the first and the second diffusion plates 190*a* and 190*b* shown in FIG. 7, detailed description thereof will be replaced by the foregoing description of FIG. 7.

Meanwhile, the optical members 137*a*' and 137*b*' of the lighting module according to the third embodiment can be also applied to the lighting module according to the second embodiment.

Fourth Embodiment

FIG. 20 is an exploded perspective view of a lighting module according to a fourth embodiment. FIG. 21 is a cross sectional view of the lighting module shown in FIG. 20.

Here, the perspective view of the lighting module shown in FIGS. 20 to 21 may be similar to that of the lighting module shown in FIGS. 1 and 2. Therefore, the perspective view of the lighting module according to the fourth embodiment will be replaced by the perspective views shown in FIGS. 1 and 2.

In many configurations of the lighting module according to the fourth embodiment shown in FIGS. 20 and 21, the same reference numerals will be assigned to the same configurations as those of the lighting module according to the second embodiment shown in FIGS. 10 to 11. Therefore, in many configurations of the lighting module according to the fourth embodiment, descriptions of the same configurations as those of the lighting module according to the second embodiment will be replaced by the descriptions of the lighting module according to the second embodiment.

Hereafter, the following description will focus on differences between the lighting module according to the fourth embodiment and the lighting module according to the second embodiment.

The lighting module according to the fourth embodiment shown in FIGS. 20 to 21 may include the first and the second plates 110*a* and 110*b*, a first and a second light source units 130*a*' and 130*b*', the first and the second cases 150*a* and 150*b*, a reflector 160 and the first and the second end caps 170*a* and 170*b*.

The lighting module according to the fourth embodiment shown in FIGS. 20 to 21 is formed by further adding the reflector 160 to the lighting module according to the second embodiment shown in FIGS. 10 to 11.

The reflector 160 reflects the light emitted from the first and the second light source units 130*a*' and 130*b*' to the first and the second plates 110*a* and 110*b*.

The reflector 160 is disposed between the first case 150 and the second case 150*b*. Specifically, the reflector 160 may be disposed at a middle position between the first case 150*a* and the second case 150*b*. Also, the reflector 160 is disposed between the first plate 110*a* and the second plate 110*b*. Specifically, the reflector 160 may be disposed at a middle position between the first plate 110*a* and the second plate 110*b*. Also, the reflector 160 is disposed between the first light source unit 130*a*' and the second light source unit 130*b*'. Specifically, the reflector 160 may be disposed at a middle position between the first light source unit 130*a*' and the second light source unit 130*b*'.

The reflector 160 has a cylindrical shape extending in one direction. Here, the outer surface of the reflector 160 is a reflective surface. Since the reflective surface of the reflector 160 is a rounded curved surface, it is possible to widely distribute the light emitted from the first and the second light source units 130a' and 130b'.

The shape of the reflector 160 is not limited to the cylindrical shape. Another example of the reflector 160 will be described with reference to FIGS. 22 to 23.

FIG. 22 is a cross sectional view showing another example of the lighting module shown in FIG. 21 according to the fourth embodiment. FIG. 23 is a perspective view of only a reflector 160' shown in FIG. 22.

In the lighting module shown in FIG. 22, all configurations except for the reflector 160' are the same as those of the lighting module shown in FIG. 21, only the reflector 160' will be described in the following description.

Referring to FIGS. 22 and 23, the reflector 160' may have a polygonal box shape extending in one direction. Here, the cross section of the reflector 160' may be a lozenge-shaped. In the present specification, a 'lozenge shape' includes not only a geometrically perfect lozenge but also a shape in which four sides of the reflector 160' are curved in the inward or outward direction of the reflector 160'.

Specifically, the reflector 160' may have at least four reflective surfaces 160'-1, 160'-2, 160'-3 and 160'-4. The four reflective surfaces 160'-1, 160'-2, 160'-3 and 160'-4 may be curved in the inward direction of the reflector 160'. Here, though not shown in the drawing, the four reflective surfaces 160'-1, 160'-2, 160'-3 and 160'-4 may be curved in the outward direction of the reflector 160'.

The four reflective surfaces 160'-1, 160'-2, 160'-3 and 160'-4 may have the same curvature or mutually different curvatures. For example, two reflective surfaces 160'-1 and 160'-2 adjacent to the first plate 110a among the four reflective surfaces 160'-1, 160'-2, 160'-3 and 160'-4 may have a curvature different from that of two reflective surfaces 160'-3 and 160'-4 adjacent to the second plate 110b. Also, the four reflective surfaces 160'-1, 160'-2, 160'-3 and 160'-4 may have mutually different curvatures.

The reflectors 160 and 160' shown in FIGS. 21 and 22 are connected to the first and the second end caps 170a and 170b, so that the reflectors 160 and 160' may be disposed between the first and the second plates 110a and 110b or the first and the second light source units 130a and 130b or the first and the second cases 150a and 150b. Here, the reflector 160 may be connected to the first and the second end caps 170a and 170b by a coupling means such as a screw.

Meanwhile, the first and the second light source units 130a' and 130b' of the lighting module according to the fourth embodiment shown in FIGS. 20 to 21 may be the first and the second light source units 130a and 130b of the lighting module according to the first embodiment shown in FIGS. 1 to 5.

FIG. 24 is a cross sectional view showing a modified example of the lighting module shown in FIG. 21.

Specifically, the lighting module shown in FIG. 24 is formed by further adding the first and the second optical sheets 120a and 120b to the lighting module shown in FIG. 21. Since the first and the second optical sheets 120a and 120b are the same as the first and the second optical sheets 120a and 120b shown in FIG. 6, detailed description thereof will be replaced by the foregoing description of FIG. 6.

FIG. 25 is a cross sectional view showing another modified example of the lighting module shown in FIG. 21.

The lighting module shown in FIG. 25 is formed by further adding the first and the second diffusion plates 190a and 190b to the lighting module shown in FIG. 24. Since the first and the second diffusion plates 190a and 190b are the same as the first and the second diffusion plates 190a and 190b shown in FIG. 7, detailed description thereof will be replaced by the foregoing description of FIG. 7.

FIGS. 26 and 27 are graphs showing optical characteristics of the lighting module shown in FIG. 25.

In the graph shown in FIG. 26, the horizontal axis represents positions and the vertical axis represents brightness (lux). Here, '0' of the horizontal axis corresponds to a middle position between the first light source unit 130a' shown in FIG. 25 and the second light source unit.

Referring to FIGS. 26 and 27, it can be seen that the lighting module shown in FIG. 25 emits light upward and downward at the same time and the amount of the light emitted downward is larger than the amount of the light emitted upward.

FIGS. 28 and 29 are graphs showing optical characteristics when the reflector 160 of the lighting module shown in FIG. 25 is replaced by the reflector 160' shown in FIG. 22.

In the graph shown in FIG. 28, the horizontal axis represents positions and the vertical axis represents brightness (lux). Here, '0' of the horizontal axis corresponds to a middle position between the first light source unit 130a' shown in FIG. 25 and the second light source unit.

Referring to FIGS. 28 and 29, it can be seen that the lighting module which is shown in FIG. 25 and includes the reflector 160' shown in FIG. 22 emits light upward and downward at the same time and the amount of the light emitted downward is larger than the amount of the light emitted upward.

Fifth Embodiment

FIG. 30 is a top perspective view of a lighting module according to a fifth embodiment. FIG. 31 is a bottom perspective view of the lighting module shown in FIG. 30. FIG. 32 is an exploded perspective view of the lighting module shown in FIG. 30. FIG. 33 is a cross sectional view taken along line B-B' of FIG. 30.

The configuration of the lighting module according to the fifth embodiment is the same as or similar to that of the lighting module according to the fourth embodiment. The same reference numerals will be assigned to the same components. Hereafter, the following description will focus on a difference between the lighting module according to the fifth embodiment and the lighting module according to the fourth embodiment.

Referring to FIGS. 30 to 33, the lighting module according to the fifth embodiment may include a first and a second plates 110a' and 110b', the first and the second light source units 130a' and 130b', the first and the second cases 150a and 150b and the first and the second end caps 170a and 170b.

The first and the second plates 110a' and 110b' of the lighting module according to the fifth embodiment are different from the first and the second plates 110a and 110b of the lighting module according to the fourth embodiment shown in FIGS. 20 to 21. This will be described below in detail.

The first plate 110a' is formed of the same material as that of the first plate 110a of the lighting module according to the fourth embodiment shown in FIGS. 20 to 21. The holes 115a are formed in a portion of the first plate 110a' instead of the entire surface of the first plate 110a'. This will be described in detail with reference to FIG. 34.

FIG. 34 is a front view showing the inner surface of the first plate 110a' shown in FIG. 30.

Referring to FIG. 34, the first plate 110a' may include a central portion 111a' and outer portions 113a' and 113b'.

The central portion 111a' is disposed in the center of the plate 110a' and the outer portions 113a' and 113b' are disposed on both sides of the central portion 111a'.

The central portion 111a' may include holes 115a. The hole 115a penetrates the outer surface and inner surface of the first plate 110a'. A plurality of the holes 115a are formed in the first plate 110a'. Various modified examples of the first plate 110a' will be described with reference to FIGS. 35 to 37.

FIGS. 35 to 37 are front views showing modified examples of the first plate 110a' shown in FIG. 34.

Referring to FIG. 35, a first plate 110a" includes the central portion 111a' and the outer portions 113a' and 113b'. The central portion 111a' includes a plurality of holes 115a'. The hole 115a' is smaller and more than the hole 115a shown in FIG. 34.

Referring to FIG. 36, a first plate 110a''' includes the central portion 111a' and the outer portions 113a' and 113b'. The central portion 111a' includes a first hole 115a"-1 and a plurality of second holes 115a"-2. The first hole 115a"-1 is disposed in the center of the central portion 111a' and has a rectangular shape extending in one direction. The second holes 115a"-2 are disposed on both sides of the first hole 115a"-1 in a line respectively. The size of the second hole 115a"-2 is smaller than that of the first hole 115a"-1.

Referring to FIG. 37, a first plate 110a"" includes the central portion 111a' and the outer portions 113a' and 113b'. The central portion 111a' includes a plurality of first holes 115a'''-1 and a plurality of second holes 115a'''-2. The plurality of the first holes 115a'''-1 are disposed in the center of the central portion 111a' in a line. The plurality of the second holes 115a'''-2 are disposed on both sides of the first hole 115a'''-1 in a line respectively. The size of the second hole 115a'''-2 is smaller than that of the first hole 115a'''-1.

Referring back to FIG. 34, light reflected by the reflector 160 shown in FIG. 33 and light reflected by the inner surface of the second plate 110b' are incident on the central portion 111a'. Here, when the incident light travels toward the hole 115a, the incident light is emitted outwardly through the hole 115a. When the incident light passes through spaces among the holes 115a, the light is incident on the inner surface of the first plate 110a' and then is reflected again by the reflector 160 or the second plate 110b'.

The outer portions 113a' and 113b' do not have the hole 115a. Therefore, the outer portions 113a' and 113b' reflect the light emitted from the first and the second light source units 130a' and 130b' shown in FIG. 32 to the second plate 110b'. The outer portions 113a' and 113b' may allow the amount of the light emitted through the second plate 110b' to be greater than the amount of the light emitted through the hole 115a of the first plate 110a'.

Although the hole 115a has a quadrangular shape in the drawing, the hole 115a may have various shapes without being limited to this.

Referring back to FIGS. 30 to 33, the second plate 110b' is an optical plate.

The optical plate 110b' transmits the light emitted from the first and the second plates 110a' and 110b'. The optical plate 110b' may include a general transparent glass plate, a plastic plate or polycarbonate (PC) plate.

The optical plate 110b' may diffuse the light incident on the inner surface thereof and transmit the light. The optical plate 110b' may be formed of a translucent or opaque material so as to protect users' eyes.

When the light emitting device 133a of the first light source unit 130a' is a light emitting diode, the optical plate 110b' may excite the light emitted from the light emitting diode 133a. For this purpose, the optical plate 110b' may include the foregoing fluorescent material.

The reflector 160 of the lighting module according to the fifth embodiment may be the reflector 160 of the lighting module according to the fourth embodiment shown in FIGS. 20 to 21 or the reflector 160' shown in FIGS. 22 to 23.

FIG. 38 is a cross sectional view showing a modified example of the lighting module shown in FIG. 33.

Specifically, the lighting module shown in FIG. 38 is formed by further adding the first optical sheet 120a and the second optical sheet 120b to the lighting module shown in FIG. 33. Since the first and the second optical sheets 120a and 120b are the same as the first and the second optical sheets 120a and 120b shown in FIG. 6, detailed description thereof will be replaced by the foregoing description of FIG. 6.

FIG. 39 is a cross sectional view showing another modified example of the lighting module shown in FIG. 33.

The lighting module shown in FIG. 39 is formed by further adding the first and the second diffusion plates 190a and 190b to the lighting module shown in FIG. 38. Since the first and the second diffusion plates 190a and 190b are the same as the first and the second diffusion plates 190a and 190b shown in FIG. 7, detailed description thereof will be replaced by the foregoing description of FIG. 7.

Sixth Embodiment

FIG. 40 is a top perspective view of a lighting module according to a sixth embodiment. FIG. 41 is a bottom perspective view of the lighting module shown in FIG. 40. FIG. 42 is a cross sectional view taken along line C-C' of FIG. 40.

Referring to FIGS. 40 to 42, the lighting module according to the sixth embodiment may include a first plate 110a", a second plate 110b", the first and the second light source units 130a" and 130b", a first and a second cases 150a' and 150b', a reflector 160" and the first and the second end caps 170a and 170b. Here, since the first and the second end caps 170a and 170b are the same as the first and the second end caps 170a and 170b of the lighting module according to the first embodiment shown in FIGS. 1 to 4, detailed descriptions thereof will be omitted.

The first and the second cases 150a' and 150b' will be described first.

Referring to FIGS. 40 to 42, the first case 150a' receives the first light source unit 130a". The second case 150b' receives the second light source unit 130b".

The first case 150a' receives one sides of the first and the second plates 110a" and 110b". The second case 150b' also receives the other sides of the first and the second plates 110a" and 110b".

The reflector 160" is disposed between the first case 150a' and the second case 150b'. Therefore, the first and the second light source units 130a" and 130b", the first plate 110a", the second plate 110b" and the reflector 160" are disposed between the first case 150a' and the second case 150b'.

The first and the second cases 150a' and 150b' may be formed of a material capable of easily radiating heat generated from the first and the second light source units 130a" and 130b", for example, Al, an alloy including Al and the like.

Hereafter, the first case 150a' will be described in detail with reference to the drawings together with FIG. 43. Here, since the first case 150a' is the same as the second case 150b', a description of the second case 150b' will be replaced by the following description of the first case 150a'.

FIG. 43 is a view showing only the enlarged first case 150a' shown in FIG. 42.

Referring to FIGS. 40 to 43, the first case 150a' includes a receiver 151a'. The receiver 151a' may be defined by a reflective surface 153a' and a disposition surface 155a'. The receiver 151a' receives the first light source unit 130a".

The reflective surface 153a' reflects the light emitted from the light emitting device 133a of the first light source unit 130a" toward the second case 150b' or the reflector 160".

The lights reflected by the reflective surface 153a' may be parallel light. Here, the parallel light travels from the first case 150a' to the second case 150b' or travels in parallel with the inner surfaces of the first and the second plates 110a" and 110b".

The reflective surface 153a' may be a paraboloid. When the light emitting device 133a is located at the focus of the paraboloid 153a', the light emitted from the light emitting device 133a is reflected by the paraboloid 153a' and becomes parallel light.

The first light source unit 130a" is disposed on the disposition surface 155a'. The disposition surface 155a' may be flat. The disposition surface 155a' may be parallel with the inner surfaces of the first and the second plates 110a" and 110b". At least a part of the light reflected by the disposition surface 155a' and the reflective surface 153a' may be parallel. The disposition surface 155a' may contact with the bottom surface of the substrate 131a of the first light source unit 130a".

The first case 150a' may include a first groove 157a'-1 and a second groove 157a'-2.

One side of the first plate 110a" is inserted into the first groove 157a'-1. One side of the second plate 110b" is inserted into the second groove 157a'-2. The first and the second plates 110a" and 110b" may be coupled to the first case 150a' in a sliding manner by means of the first groove 157a'-1 and the second groove 157a'-2.

Referring back to FIGS. 40 to 42, the first light source unit 130a" is received in the first case 150a'. The first light source unit 130a" is received in the receiver 151a' shown in FIG. 43. The first light source unit 130a" is disposed on the disposition surface 155a' shown in FIG. 43 and emits light from the second plate 110b" to the first plate 110a".

The first light source unit 130a" includes the substrate 131a and the light emitting device 133a of the lighting module according to the first embodiment shown in FIGS. 1 to 4. Here, the position where the substrate 131a of the first light source unit 130a" is disposed is different from the position where the substrate 131a of the lighting module according to the first embodiment is disposed. Specifically, the substrate 131a of the first light source unit 130a" is disposed on the disposition surface 155a' of the first case 150a' shown in FIG. 43. With the exception of the position where the substrate 131a of the first light source unit 130a" is disposed, the substrate 131a and the light emitting device 133a of the first light source unit 130a" is the same as the substrate 131a and the light emitting device 133a of the lighting module according to the first embodiment, detailed descriptions thereof will be omitted.

Since the second light source unit 130b" is the same as the first light source unit 130a", a description of the second light source unit 130b" will be replaced by the description of the first light source unit 130a".

The first and the second plates 110a" and 110b" transmit the light which has been emitted from the first and the second light source units 130a" and 130b" and reflected by the reflector 160". The first and the second plates 110a" and 110b" are optical plates and may include a general transparent glass plate, a plastic plate or polycarbonate (PC) plate.

The first and the second plates 110a" and 110b" may diffuse the light incident on the inner surface thereof and transmit the light. The first and the second plates 110a" and 110b" may be formed of a translucent or opaque material so as to protect users' eyes.

When the light emitting devices of the first and the second light source units 130a" and 130b" are light emitting diodes, the first and the second plates 110a" and 110b" may excite the light emitted from the light emitting diode. For this purpose, the first and the second plates 110a" and 110b" may include a fluorescent material.

The first and the second plates 110a" and 110b" may also further include an additive. The additive disperses uniformly the fluorescent material within the first and the second plates 110a" and 110b". The first and the second plates 110a" and 110b" may also further include a diffusing agent. The diffusing agent may increase the excitation ratio of the fluorescent material included in the first and the second plates 110a" and 110b".

Details other than the above descriptions of the first and the second plates 110a" and 110b" are the same as those of the first and the second plates 110a and 110b shown in FIGS. 1 to 4, descriptions thereof will be replaced by the description of the first and the second plates 110a and 110b shown in FIGS. 1 to 4.

The reflector 160" re-reflects the light, which has been emitted from the first and the second light source units 130a" and 130b" and reflected by the first and the second cases 150a' and 150b', toward the first and the second plates 110a" and 110b".

The reflector 160" is disposed between the first case 150' and the second case 150b'. Specifically, the reflector 160" may be disposed at a middle position between the first case 150a' and the second case 150b'. Also, the reflector 160" is disposed between the first plate 110a" and the second plate 110b". Specifically, the reflector 160" may be disposed at a middle position between the first plate 110a" and the second plate 110b". Also, the reflector 160" is disposed between the first light source unit 130a" and the second light source unit 130b". Specifically, the reflector 160" may be disposed at a middle position between the first light source unit 130a" and the second light source unit 130b". The structure of the reflector 160" will be described in detail with reference to FIG. 44.

FIG. 44 is a perspective view of only the reflector 160" shown in FIG. 42.

Referring to FIGS. 42 and 44, the reflector 160" may have a polygonal box shape extending in one direction. Here, the cross section of the reflector 160" may be a lozenge-shaped. In the present specification, a 'lozenge shape' includes not only a geometrically perfect lozenge but also a shape in which four sides forming the lozenge are curved in the inward or outward direction of the reflector 160".

The reflector 160" may have at least four reflective surfaces 160"-1, 160"-2, 160"-3 and 160"-4. The first to the fourth reflective surfaces 160"-1, 160"-2, 160"-3 and 160"-4 may be curved in the inward direction of the reflector 160". Here, though not shown in the drawing, the first to the fourth reflective surfaces 160"-1, 160"-2, 160"-3 and 160"-4 may be curved in the outward direction of the reflector 160".

The first to the fourth reflective surfaces 160"-1, 160"-2, 160"-3 and 160"-4 may have mutually different curvatures. For example, the first and the second reflective surfaces 160"-1 and 160"-2 adjacent to the first plate 110a" among the first to the fourth reflective surfaces 160"-1, 160"-2, 160"-3 and 160"-4 may have a curvature different from that of the third and the fourth reflective surfaces 160"-3 and 160"-4 adjacent to the second plate 110b". More specifically, the curvatures of the first and the second reflective surfaces 160"-1 and 160"-2 may be the same as each other and the curvatures of the third and the fourth reflective surfaces 160"-3 and 160"-4 may be the same as each other. However, the curvatures of the first and the second reflective surfaces 160"-1 and 160"-2 may be smaller than the curvatures of the third and the fourth reflective surfaces 160"-3 and 160"-4. In this case, the longest distance from the first and the second reflective surfaces 160"-1 and 160"-2 to the inner surface of the first plate 110a" is less than the longest distance from the third and the fourth reflective surfaces 160"-3 and 160"-4 to the inner surface of the second plate 110b".

As such, when the first to the fourth reflective surfaces 160"-1, 160"-2, 160"-3 and 160"-4 have mutually different curvatures, it is possible to control to cause the amount of the light emitted from the first plate 110a" to be different from the amount of the light emitted from the second plate 110b". It is also possible to control to cause the distribution type of the light emitted from the first plate 110a" to be different from the distribution type of the light emitted from the second plate 110b". For example, the light emitted from the first plate 110a" may have Lambertian light distribution and the light emitted from the second plate 110b" may have bat wing light distribution.

FIGS. 45 to 46 are graphs showing optical characteristics of the lighting module shown in FIG. 42.

In the graph shown in FIG. 45, the horizontal axis represents positions and the vertical axis represents brightness (lux). Here, '0' of the horizontal axis corresponds to a middle position between the first light source unit 130a" shown in FIG. 42 and the second light source unit 130b".

Referring to FIGS. 45 and 46, it can be seen that the lighting module shown in FIG. 42 emits light upward and downward at the same time and the amount of the light emitted downward is larger than the amount of the light emitted upward.

In the mean time, the following Table 1 shows specifications of the lighting module according to the above-described first to the sixth embodiments.

TABLE 1

| Product | Item | | Value | |
|---|---|---|---|---|
| Strip Spce. (13S * 5P) | Voltage(V) | | 39 | |
| | Current(mA) | | 350 | |
| | Power(W) | | 13.65 | |
| Module Spec. | Total Lumen output(lm) | Up Lumen Output | 2,500 | 500 |
| | | Down Lumen Output | | 2,000 |
| | Module Power(W) | | 27.3 | |
| | Efficacy(lm/W) | | 90 | |
| | CCT(K) | | 4,000 | |
| | CRI | | 80 | |
| Fixture Spec. | Lumen Output(lm) | | 10,000 (Up: 2,000, Down: 8,000) | |
| | DC Power Consumption(W) | | 110 | |

Referring to the table 1, in the lighting module according to the first to the sixth embodiments, the lumen output of the light emitted upward is less than that of the light emitted downward. However, contrary to this, the lumen output of the light emitted upward may be greater than that of the light emitted downward.

More specifically, in the lighting module according to the first to the sixth embodiments, the lumen output of the light emitted downward may be equal to or greater than 1 time and equal to or less than 9 times the lumen output of the light emitted upward.

A value of the width W (mm)×height H (mm)×length L (mm) of the lighting module according to the first to the sixth embodiments may be any one of 80*12*560 and 45*12*560.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

The invention claimed is:

1. A lighting module, comprising:
   a first light source and a second light source provided to face each other;
   a first case, the first light source provided on the first case;
   a second case, the second light source provided on the second case;
   a first plate having a first side connected to the first case and a second side connected to the second case, the first plate having a plurality of first holes through which light emitted from the first and the second light sources passes;
   a second plate facing the first plate and having a plurality of second holes through which the light emitted from the first and the second light sources passes; and
   first and second optical sheets provided on the first and the second plates, wherein a sum of sizes of the first holes is different from a sum of sizes of the second holes, and wherein an amount of the light emitted through the first plate is different from an amount of the light emitted through the second plate.

2. The lighting module of claim 1, wherein the first optical sheet diffusely reflects at least a part of the light emitted from the first and the second light sources, and wherein the second optical sheet specularly or regularly reflects at least a part of the light emitted from the first and the second light sources.

3. The lighting module of claim 1, wherein the first holes and the second holes are provided uniformly.

4. The lighting module of claim 1, wherein the first light source includes a substrate and a light emitting device provided on the substrate, wherein the first case includes a base on which the substrate is provided and an upper case and a lower case, both of which are provided to face each other, wherein the upper case is coupled to one side of the first plate and wherein the lower case is coupled to one side of the second plate.

5. The lighting module of claim 1, further including a reflective member which is provided in the first case and reflects the light emitted from the first light source toward the second light source.

6. The lighting module of claim 5, wherein the first light source includes a substrate and a light emitting device provided on the substrate, wherein the reflective member includes a first reflective member and a second reflective member, wherein the first reflective member is provided on one side of the light emitting device, and wherein the second reflective member is provided on the other side of the light emitting device.

7. The lighting module of claim 6, wherein a reflective surface of the first reflective member and a reflective surface of the second reflective member are symmetrical or asymmetrical to each other.

8. The lighting module of claim 1, further including an optical member which is provided in the first case and collects the light emitted from the first light source toward the second light source.

9. The lighting module of claim 1, further including a reflector which is provided between the first light source and the second light source and includes a reflective surface reflecting the light emitted from the first and the second light sources toward the first and the second plates.

10. The lighting module of claim 9, wherein the reflector comprises a plurality of the reflective surfaces and wherein the plurality of the reflective surfaces have the same curvature or mutually different curvatures.

11. The lighting module of claim 1, wherein the first light source includes a substrate and a light emitting device provided on the substrate, wherein the first case includes a base on which the substrate is provided and an upper case and a lower case, both of which are provided to face each other, wherein the upper case has a first recess into which one end of the first plate is inserted, and wherein the lower case has a second recess into which one end of the second plate is inserted.

12. A lighting module, comprising:
a first light source and a second light source provided to face each other;
a first case, the first light source provided in the first case;
a second case, the second light source provided in the second case;
a first plate having a first side connected to the first case and a second side connected to the second case, the first plate having a plurality of holes through which a light emitted from the first and the second light sources passes, and including an inner surface which reflects the light emitted from the first and the second light sources; and
a second plate facing the first plate that transmits the light emitted from the first and the second light sources,
wherein an amount of light passed through the holes of the first plate is different from an amount of light transmitted through the second plate.

13. The lighting module of claim 12, wherein the first plate includes both a central portion including the hole and an outer edge provided on both sides of the central portion.

14. The lighting module of claim 12, further including an optical sheet provided on the first plate, wherein the optical sheet diffusely reflects incident light.

15. A lighting module, comprising:
first light source and a second light source provided to face each other;
a first case, the first light source provided in the first case and the first case having a first reflective surface that reflects light emitted from the first light source and a first disposition surface on which the first light source is provided;
a second case, the second light source provided in the second case and the second case having a second reflective surface reflecting light emitted from the second light source and a second disposition surface on which the second light source is provided;
a first optical plate having a first side connected to the first case, and a second side connected to the second case, the first optical plate emitting light provided by the first case; and
a second optical plate facing the first optical plate and emitting light provided by the second case,
wherein a shape of the first disposition surface is different from a shape of the first reflective surface, and
wherein an amount of light emitted through the first optical plate is different from an amount of light emitted through the second optical plate.

16. The lighting module of claim 15, further comprising a reflector which is disposed between the first case and the second case and reflects the light provided by the first and the second cases toward the first and the second optical plates.

17. The lighting module of claim 16, wherein the reflector comprises a first reflective surface and a second reflective surface, wherein the first reflective surface reflects incident light to the first optical plate, wherein the second reflective surface reflects the incident light to the second optical plates, wherein the first reflective surface of the reflector has curvature different from that of the second reflective surface of the reflector.

18. The lighting module of claim 17, wherein the longest distance from the first plate to the first reflective surface of the reflector is different from the longest distance from the second plate to the second reflective surface of the reflector.

19. The lighting module of claim 15, wherein the first reflective surface of the first case converts incident light into parallel light.

20. The lighting module of claim 15, wherein the first disposition surface is parallel with a top surface of the second optical plate.

* * * * *